(12) United States Patent
Raleigh et al.

(10) Patent No.: US 12,095,632 B2
(45) Date of Patent: Sep. 17, 2024

(54) ADAPTIVE AMBIENT SERVICES

(71) Applicant: Headwater Research LLC, Tyler, TX (US)

(72) Inventors: Gregory G Raleigh, Incline Village, NV (US); Rob Rightmyer, Ithaca, NY (US); Vladislav Kudelin, Mountain View, CA (US)

(73) Assignee: Headwater Research LLC, Tyler, TX (US)

( * ) Notice: Subject to any disclaimer, the term of this patent is extended or adjusted under 35 U.S.C. 154(b) by 0 days.

(21) Appl. No.: 18/221,339

(22) Filed: Jul. 12, 2023

(65) Prior Publication Data

US 2023/0362068 A1 Nov. 9, 2023

Related U.S. Application Data

(63) Continuation of application No. 17/106,648, filed on Nov. 30, 2020, now Pat. No. 11,750,477, which is a
(Continued)

(51) Int. Cl.
*H04L 41/5041* (2022.01)
*G06Q 30/0601* (2023.01)
(Continued)

(52) U.S. Cl.
CPC ..... *H04L 41/5041* (2013.01); *G06Q 30/0601* (2013.01); *G06Q 50/10* (2013.01);
(Continued)

(58) Field of Classification Search
CPC .............. H04L 47/803; H04L 67/28; H04L 41/5041; H04L 41/5045; H04L 41/5054;
(Continued)

(56) References Cited

U.S. PATENT DOCUMENTS

| 7,672,695 | B1 | 3/2010 | Rainnie et al. |
| 7,720,505 | B2 * | 5/2010 | Gopi ..................... H04W 12/06 455/425 |

(Continued)

OTHER PUBLICATIONS

Arm TrustZone Microprocessor Report, dated Aug. 25, 2033.
(Continued)

*Primary Examiner* — Andrew Joseph Rudy
(74) *Attorney, Agent, or Firm* — Farjami & Farjami LLP

(57) ABSTRACT

Adaptive ambient services are provided. In some embodiments, an adaptive ambient service includes providing an ambient service profile. In some embodiments, an ambient service includes implementing an ambient service profile for assisting control of the communications device use of an ambient service on a wireless network, in which the ambient service profile includes a plurality of service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service.

16 Claims, 7 Drawing Sheets

Related U.S. Application Data continuation of application No. 16/272,198, filed on Feb. 11, 2019, now Pat. No. 10,855,559, which is a continuation of application No. 15/400,768, filed on Jan. 6, 2017, now Pat. No. 10,237,146, which is a continuation of application No. 14/612,073, filed on Feb. 2, 2015, now Pat. No. 9,544,397, which is a continuation of application No. 14/256,593, filed on Apr. 18, 2014, now Pat. No. 8,948,025, which is a continuation of application No. 13/588,965, filed on Aug. 17, 2012, now Pat. No. 8,868,455, which is a continuation of application No. 12/695,020, filed on Jan. 27, 2010, now Pat. No. 8,406,748, which is a continuation-in-part of application No. 12/380,780, filed on Mar. 2, 2009, now Pat. No. 8,839,388.

(60) Provisional application No. 61/275,208, filed on Aug. 25, 2009, provisional application No. 61/237,753, filed on Aug. 28, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.

| | |
|---|---|
| *G06Q 50/10* | (2012.01) |
| *H04L 41/0806* | (2022.01) |
| *H04L 41/0893* | (2022.01) |
| *H04L 45/302* | (2022.01) |
| *H04L 47/70* | (2022.01) |
| *H04L 47/80* | (2022.01) |
| *H04L 67/00* | (2022.01) |
| *H04L 67/04* | (2022.01) |
| *H04L 67/306* | (2022.01) |
| *H04L 67/50* | (2022.01) |
| *H04L 67/53* | (2022.01) |
| *H04L 67/56* | (2022.01) |
| *H04L 69/24* | (2022.01) |
| *H04W 4/50* | (2018.01) |
| *H04W 8/18* | (2009.01) |
| *H04W 8/24* | (2009.01) |
| *H04W 48/14* | (2009.01) |
| *H04W 72/29* | (2023.01) |
| *H04W 72/53* | (2023.01) |
| *H04L 41/5054* | (2022.01) |
| *H04W 80/04* | (2009.01) |

(52) U.S. Cl.
CPC ...... *H04L 41/0806* (2013.01); *H04L 41/0893* (2013.01); *H04L 41/5045* (2013.01); *H04L 45/306* (2013.01); *H04L 47/803* (2013.01); *H04L 47/824* (2013.01); *H04L 67/04* (2013.01); *H04L 67/306* (2013.01); *H04L 67/34* (2013.01); *H04L 67/53* (2022.05); *H04L 67/535* (2022.05); *H04L 67/56* (2022.05); *H04L 69/24* (2013.01); *H04W 4/50* (2018.02); *H04W 8/18* (2013.01); *H04W 8/24* (2013.01); *H04W 48/14* (2013.01); *H04W 72/29* (2023.01); *H04W 72/53* (2023.01); *H04L 41/5054* (2013.01); *H04W 80/04* (2013.01)

(58) Field of Classification Search
CPC ............ H04L 41/0806; H04L 41/0839; H04L 45/306; H04L 47/824; H04L 63/105; H04L 63/30; H04L 67/04; H04L 67/20; H04L 67/22; H04L 67/24; H04L 69/24; H04W 72/0433; H04W 8/24; G06Q 50/10; G06Q 30/0601
USPC .............................. 701/2, 500; 709/216–225
See application file for complete search history.

(56) References Cited

U.S. PATENT DOCUMENTS

| | | | |
|---|---|---|---|
| 7,849,310 B2 | 12/2010 | Watt et al. | |
| 7,881,267 B2 | 2/2011 | Crosswy et al. | |
| 8,064,417 B2 | 11/2011 | Maki | |
| 8,184,535 B2* | 5/2012 | Jechoux | H04W 52/0216 455/448 |
| 8,271,025 B2* | 9/2012 | Brisebois | H04W 48/18 455/552.1 |
| 8,301,141 B1* | 10/2012 | Reeves | H04W 4/16 455/418 |
| 8,676,273 B1* | 3/2014 | Fujisaki | H04M 1/724 455/418 |
| 8,793,758 B2* | 7/2014 | Raleigh | H04L 41/046 455/414.1 |
| 8,924,469 B2* | 12/2014 | Raleigh | G06Q 30/04 455/406 |
| 10,064,055 B2* | 8/2018 | Raleigh | H04L 63/0876 |
| 10,334,510 B2* | 6/2019 | Brisebois | H04M 15/28 |
| 11,743,717 B2* | 8/2023 | Raleigh | H04L 63/08 455/414.1 |
| 2004/0123153 A1 | 6/2004 | Wright et al. | |
| 2006/0112427 A1 | 5/2006 | Shahbazi | |
| 2006/0183461 A1 | 8/2006 | Pearce | |
| 2006/0187874 A1* | 8/2006 | Zaki | H04W 88/04 370/328 |
| 2007/0006289 A1 | 1/2007 | Limont et al. | |
| 2007/0061535 A1 | 3/2007 | Xu et al. | |
| 2007/0104169 A1 | 5/2007 | Polson | |
| 2007/0288989 A1 | 12/2007 | Aarnos et al. | |
| 2008/0244018 A1 | 10/2008 | Chen et al. | |
| 2009/0265754 A1 | 10/2009 | Hinds | |

OTHER PUBLICATIONS

Arm TrustZone Paper, TrustZone: Integrated Hardware and Software Security, dated Jul. 2004.
Limont Prosecution History Excerpt, U.S. Appl. No. 11/171,850, filed Jun. 30, 2005.
Plaintiff's Infringement Contention in Case No. 6:23-CV-00352-JRG-RSP, *Headwater Research LLC v. Cellco Partnership, d/b/a Verizon Wireless, Verizon Corporate Services Group Inc.* (E.D. Tex, filed Jul. 28, 2023).
IPR2024-00809 Petition for Inter Partes Review of U.S. Pat. No. 9,198,042, filed Apr. 19, 2024.
IPR2024-00809 File History of Inter Partes Review of U.S. Pat. No. 9,198,042, filed Apr. 19, 2024.

* cited by examiner ered as tech-
niques. In general, the order of the steps of disclosed
processes may be altered within the scope of the invention.

ADAPTIVE AMBIENT SERVICES

BACKGROUND

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
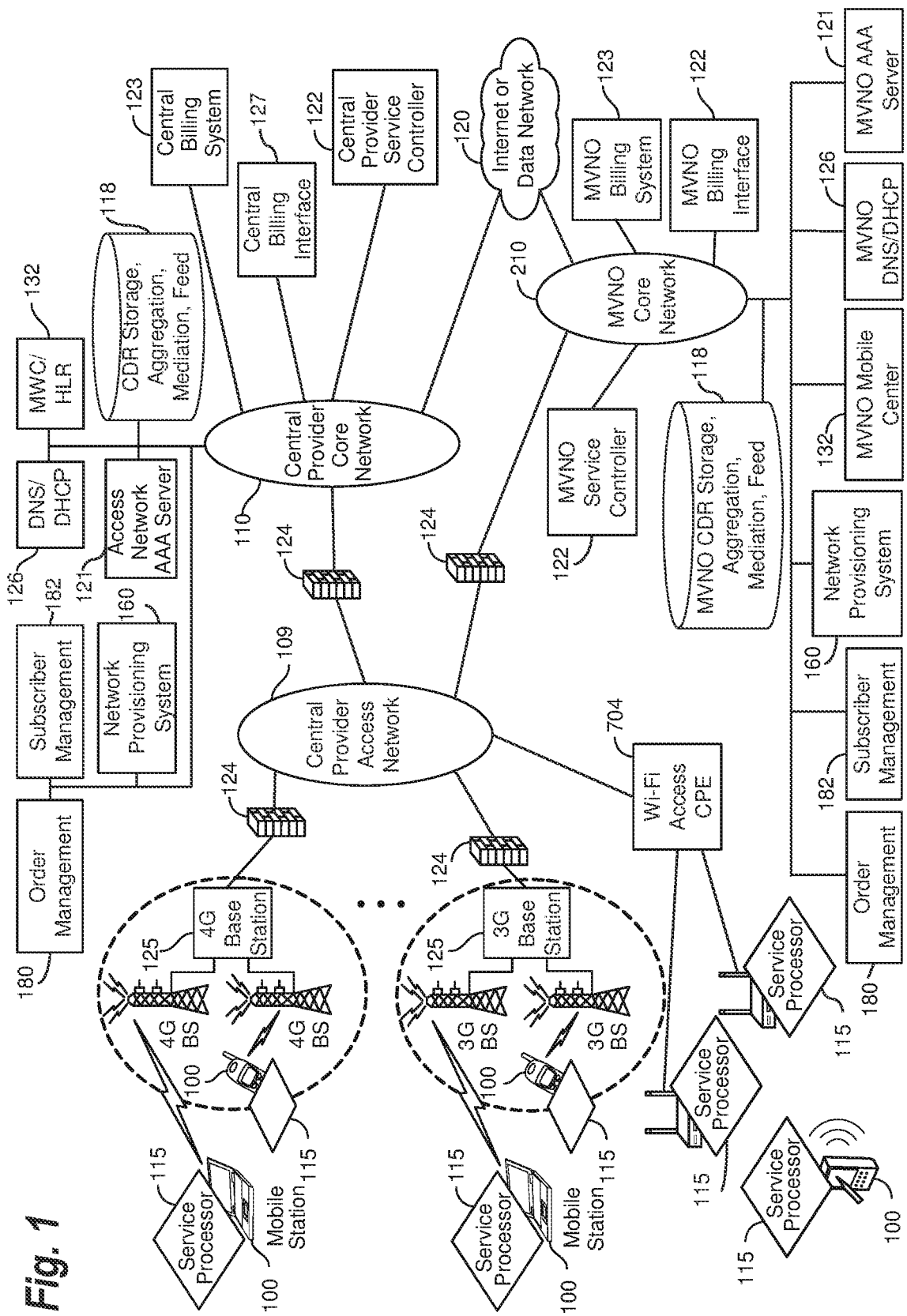
FIG. 1 illustrates a wireless network architecture for providing adaptive ambient service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, adaptive ambient services for a device (e.g., any type of device capable of communicating with a wireless network) or use of a service on a wireless network are provided. In some embodiments, an ambient experience is the user experience that is available at the time the device is sold in the event the user has not yet signed up for a service plan or the device is not sold with a prepaid service plan or other required service plan. In some embodiments, an ambient service generally refers to a set of application access, network destinations, sources, and/or traffic control rules to enable an ambient service experience, and, in some embodiments, also includes a set of billing rules to keep an accounting of service usage for different service usages (e.g., various bill by account rules or service usage accounts). For example, the ambient experience can be defined by an ambient service profile, an ambient service plan, the other service usage activity control policies, and/or the ambient service or ambient experience bill-by-account usage accounting and/or billing policies in effect in the network, on the device, on an intermediate networking device, or any combination thereof.

For example, if a service processor (e.g., on the device, the intermediate networking device, or both) is used in large part to define the ambient service profile, then the initial provisioning and activation settings in the service processor, and possibly a service controller in the network, can define the user service upgrade offering choices, network destination access control possibilities, traffic control policies, mobile commerce transaction capabilities (e.g., which transaction websites, WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet based text services have access but email downloads do not), or various other example service capabilities related to, for example, any set of application access, destinations, sources, traffic control rules to enable an ambient service experience, and/or a set of billing rules to keep an accounting of service usage for different service usages (e.g., various bill by account rules or service usage accounts). Examples of the type of useful services that can be enabled with the ambient service techniques disclosed herein include the following embodiments. In some embodiments, a content purchasing service (e.g., books, news, magazines, music, video, games, and mobile applications) is facilitated in which the device access is partially, largely, or entirely limited to the device or network based applications, source/destination addresses, and/or content transfers required to properly implement the service, in which other applications, source/destination addresses and/or content types are partly, largely, or entirely blocked. In some embodiments, such ambient services can have service usage monitoring and accounting that is reported for one or more individual ambient services. For example, the service usage for a book storefront browsing and download service can be separately accounted for while other services such as a general Internet shopping or auction service, a music service, a picture upload and store/print service, a search and/or advertisement service can also each have individual service usage accounting, or in some cases, groups of services can have aggregate service usage accounting. In some embodiments, an ambient service is provided for the device prior to the time a user has paid for permanent or full time access services, which, for example, can include a service selection platform for allowing the device user to access certain limited network functions and/or resources, and to access those network resources necessary to choose a pay-for-service plan option. In some embodiments, the individual and/or group ambient service usage accounting can be transformed into one or more billing records in which the service usage for each ambient service is billed to an entity, which can be the business entity that provides the ambient service experience and/or transaction platform, or the end user, or the central service provider, or an MVNO service provider, or a distribution partner, or an OEM, or another entity interested in paying for one or more ambient services.

In some embodiments, allowing some or all of these services, and blocking or throttling other ambient user service attempts (e.g., unpaid large file size Internet downloads or uploads or movie viewing or other access that would consume bandwidth and cause the ambient service to be a potential source of losses for the service provider) is made possible, for example, by various service profile control capabilities of the service processor and/or the service controller or using various other techniques. In some bill by account embodiments, as described herein, in which each service activity can, for example, be separately tracked with the service monitor and other agents and server functions to produce a billing offset that allows categorization and mediation of different billing entities (accounts) provides the capability for the service provider to individually account for the costs of each ambient service element. For example, this allows for business models in which the free access to the end user can be paid for or partially paid for by one or more service provider partners who are billed for service access using the bill by account capabilities (e.g., the transaction partners can pay for user access to their transaction experience and perhaps pay a revenue share for transaction billing, the advertising sponsored website partners pay for their access service share).

While the service control capabilities of the service processor and the bill by account service cost sharing and transaction revenue sharing in some cases can create a profitable ambient business model, in other cases, the ambient services can be a potential source of losses for the service provider. Accordingly, in some embodiments, the ambient service capabilities can be modified over time to reduce service cost to the service provider or VSP based on a variety of decision factors. For example, the user can have one level of traffic control for a period of time, and if the user has not signed up for service by the end of the period or if the user is no longer in good standing (e.g., based on various service usage criteria) for use of the service, the ambient service access is reduced (e.g., the transmission speed can be reduced or throttled, and/or the total volume of data transmitted can be reduced or throttled, possibly additionally according to time of day parameters and/or network busy state parameters) by changing the service control policy settings in the service processor, and the service level can be further reduced over time if the user continues to not sign up for service or the user does not create much transaction revenue. In some embodiments, this can limit or prevent users from "camping" on free ambient services without generating any meaningful revenue to fund the service, or viewing any advertising to fund the service. In some embodiments, a user can be throttled in such a manner until the user executes a "useful activity" or a "preferred activity" (e.g., a purchase, viewing advertising, answering a questionnaire, signing up for a service, accepting a beta trial, and/or earning valued customer points), and after a useful or preferred activity occurs, then the access capabilities of the device are increased. As another example, various recursive throttling algorithms can be utilized to one or more of the service activities offered in ambient service mode so that the user experiences what full speed service is like, and if the user continues consuming appreciable bandwidth with the service activity, then the activity is throttled back to reduce costs until or unless the user selects a pay-for-service plan (or accumulates sufficient service access points as described herein). In these and other similar examples, the service processor or service controller can issue the user a notification explaining that their service is currently free so their usage is being throttled, and if they desire to receive better service, service plan upgrade offers can be delivered to the user interface (UI). In some embodiments, the level of access (e.g., ambient service bandwidth and/or transfer limits, reachable addresses beyond the ambient service, and/or bandwidth or transfer limits for open Internet usage and/or email usage, text usage) is increased as the user increases the number of useful or preferred activities (e.g., the user accumulates "service access points," which are then spent on access activities). It will now be apparent to one of ordinary skill in the art that the various ambient service parameters including various provisioning and activation processes used to provide an ambient service, can also be managed by various virtual service provider (VSP) techniques. For example, this allows the same service controllers and service processor solutions to be used to define a wide range of ambient experiences for various device groups or user groups that are controlled by different VSPs.

Similarly, rather than controlling ambient service profile settings using the device assisted services functions and/or VSP functions to control the service controller, service processor, provisioning and activation settings, various other embodiments call for the ambient service profile settings to be controlled by various network based service activity control equipment as similarly described herein and/or by various intermediate networking devices. For example, depending on the level of service control and service monitoring sophistication (e.g., advanced DPI (Deep Packet Inspection), TCP (Transmission Control Protocol) session aware techniques, or other service aware techniques), some, much, most or all of the above described ambient services functionality can be implemented using network based service controls and various VSP management and control techniques. Similarly, in some embodiments, service processor, provisioning and activation settings, and the ambient service profile settings can also be (at least in part) controlled by various intermediate networking devices. In some embodiments, network equipment that can provide ambient service controls include, for example, service gateways, routers, charging functions, HLRs, home agents, proxy servers, and other network equipment as would be apparent to one of ordinary skill in the art.

Whether the ambient service monitoring and control apparatus is implemented with device assisted service techniques, network based techniques, or a combination of both, various embodiments described herein provide for adaptive ambient service embodiments that address the dynamic (e.g., non-static) nature of Internet service access needs (e.g., allowable source/destination and/or application lists, blocked source/destination and/or application lists, traffic control policies for each source/destination and/or application).

Providing an ambient service profile for an ambient service can be complicated by the variable nature of network addresses and offered services such as, for example, the Internet. For example, a central service provider, MVNO provider or VSP may desire to provide ambient service access to a given web site partner's web service, in exchange for a business deal with the website partner that motivates the service provider to provide the ambient access. In this example, the ambient access is intended to enable access (either wide open or throttled) to the website partner's collection of URLs (and possibly one or more applications) associated with the service, while blocking or differentially throttling access to other network destinations and/or applications not associated with the web site partner services. A problem can arise in this example whenever the website partner changes the addresses and/or domains associated with the website services, because any static access list and access list policies generally makes a static list impractical. In such cases, the adaptive ambient service embodiments described herein provide a solution to these and other problems, whether the adaptive ambient access controls and/or traffic controls are implemented with device assisted service apparatus, network based apparatus, or a combination of both.

As another example, an ambient service profile for a transaction service provider can include that service provider's domain or web site as an allowed destination. However, there are often inline advertisements provided by ad servers and/or partner sites that should also be included in the set of allowed destinations in the ambient service profile, and these are often dynamic or frequently changing. As another example, an ambient service provider may not want to allow access to sites that typically involve relatively high data usage (e.g., streaming and/or downloading of video content), while allowing other sites that result in less bandwidth intensive service usage activities. As another example, during a session a user may attempt to surf out of the ambient service, such as when the user attempts to access a website or service that is not an allowed or pre-approved destination in the ambient service profile (e.g., a search site can be the pre-approved ambient service, but the ambient service partner paying for the search service access may desire to also allow and pay for user click-through to search results and/or advertising offers, or, for example, an ambient shopping service sponsor may desire to also pay for click-through to vendor partners sites to provide a purchase transaction opportunity to the user). Moreover, the defined ambient service profile quickly stagnates as various applications and destinations, for example, change over time or on each request/usage (e.g., new applications become available and/or web site content and link changes occur daily if not hourly and/or are dynamically generated using well known web site techniques). Thus, what is needed are adaptive techniques for providing an adaptive ambient service.

Accordingly, in some embodiments, adaptive ambient services using an adaptive ambient service profile are provided. In some embodiments, a flexible and efficient adaptive ambient service control is provided by using an intelligent element in the network that performs one or more of the following functions: (1) beginning with an initial list of allowable ambient service device access behaviors (e.g., addresses/URLs, applications and/or content types, in some cases, with a set of traffic control policies that are differentiated as discussed above), (2) as the user accesses the ambient service, determine if the access behavior of the device is within or outside of the desired ambient service access and/or traffic control policies (e.g., determine if the access behavior is properly associated with the desired ambient services and/or service policies), (3) for those access behaviors that are within the desired ambient service policies, expand the list of allowable ambient service device access behaviors to include the new behaviors that are desired and/or preferred (e.g., new sub-domains, advertising content sources, transaction partner addresses, and/or desired surf-outs), (4) for those device access behaviors that are outside of the desired/preferred ambient service policies (e.g., are not associated or beneficially associated with the desired/preferred ambient service), expand the list of blocked or differentially throttled ambient service device access behaviors to include the new behaviors that are undesired or less desired (e.g., not preferred). In some embodiments, the intelligent network element used to adapt the ambient service control is included in one or more network equipment functions (e.g., service gateways, routers, charging gateways, HLRs, AAA, base station, service controller, and/or other network equipment functions). In some embodiments the intelligent network element used to adapt the ambient service control is included in the device and/or intermediate networking device service processor. In some embodiments, the intelligent network element used to adapt the ambient service control is included in a combination of the device (and/or intermediate networking device) and one or more network equipment functions.

In some embodiments, a flexible and efficient adaptive ambient service is provided using a baseline (e.g., a basic starting point) of an adaptive ambient service profile that includes default or previously defined (e.g., by an ambient service provider, network provider, VSP, or another entity) allowable access list and disallowed access list for the ambient service, such as to various applications, destinations, sources, traffic control rules, and/or bill by account rules or a combination thereof. In some embodiments, the ambient service profile is an automated and a self-evolving service profile using various techniques, such as those described herein.

In some embodiments, an adaptive ambient service includes providing an ambient service profile. In some embodiments, the ambient service profile includes ambient service allowed access rules and ambient service disallowed access rules. In some embodiments, the ambient service profile further includes ambient service monitored access rules, in which access to, for example, certain applications or destinations is allowed but is considered suspect or unknown, and thus, such access is monitored (e.g., until that application or destination is reclassified under ambient service allowed access rule or ambient service disallowed access rule). In some embodiments, the ambient service allowed/disallowed/monitored access rules include IP addresses, domains (e.g., URLs for web sites), or any other unique network destination or application or source identifiers. In some embodiments, the ambient service rules provide differentiated traffic control rules. In some embodiments, the differentiated traffic control rules provide differentiated bandwidth and/or total data transfer limits according to traffic control policy elements, such as activities associated with the main ambient service functions (e.g., the main partner website or a transaction service), activities associated with secondary ambient service functions (e.g., a secondary surf-out website or a less desired service activity), activities transferring different content types, activities associated with different applications, activities based on time of day, activities based on network busy state, activities that require higher or lower QOS (Quality Of Service), and/or other activities.

In some embodiments, the ambient service allowed access rules and/or ambient service disallowed access rules are pushed to (e.g., published, at predefined times, during low service usage times or periods of low service usage activities, or upon request) the device or the intermediate networking device (e.g., any type of networking device capable of communicating with a device and a network, including a wireless network, example intermediate networking devices include a femto cell, or any network communication device that translates the wireless data received from the device to a network, such as an access network) from the network (e.g., an element in the network that securely provides such data, such as a service controller for the ambient service). In some embodiments, the ambient service allowed access rules and/or ambient service disallowed access rules are pulled by (e.g., at predefined times, during low service usage times or periods of low service usage activities, or upon request) the device or the intermediate networking device from the network (e.g., an element in the network that securely provides such data, such as a service controller for the ambient service).

In some embodiments, the device or intermediate networking device includes techniques for automatically adapting the service profile based on ambient service usage and thereby updates the ambient service allowed access rules, the ambient service monitored access rules, and/or ambient service disallowed access rules locally. Device access activities that fall into the monitored access rules are those activities that are determined not to be disallowed (as of that point in time) and are allowed to take place while the intelligent adaptive service element tests the activities on the monitored access rules list to determine if they should be moved to the allowed access rules list, should be moved to the disallowed access rules list, or should remain on the monitored access rules list for further testing and/or observation. In this way, a useful and friendly user experience can be maintained as the adaptive ambient service rules undergo "training" to accommodate dynamic changes to the ambient service sites applications. The device or intermediate networking device can then periodically provide the updated ambient service allowed access rules, ambient service monitored access rules, and/or ambient service disallowed access rules with the network using various network communication techniques, such as those described herein. In some embodiments, the device periodically synchronizes its locally stored ambient service allowed access rules, ambient service monitored access rules, and/or ambient service disallowed access rules with the network using various network communication techniques, such as those described herein. In some embodiments, the training for one or more of the three lists occurs on the device. In some embodiments, the training for one or more of the three lists occurs in the network. In some embodiments, the training for one or more of the three lists occurs partly on the device and partly in the network (e.g., depending, in some cases, on the device (such as the computing/memory capacity of the device), network bandwidth, and/or any other architecture criteria).

In some embodiments, various techniques are used for providing the adaptive ambient service. Generally, in some embodiments, a requested use of the ambient service is analyzed to determine its association with the ambient service. In some embodiments, service usage traffic patterns are analyzed. In some embodiments, the requested use of the ambient service is determined to be associated or within the ambient service by querying the ambient service (e.g., a server or network function for assisting in managing the ambient service/ambient service profile(s) and/or responding to such ambient service confirmation queries). In some embodiments, the requested used of the service is analyzed by testing the requested application, destination, and/or source. In some embodiments, access for an activity not already on the allowed list or the disallowed list is initially allowed (and in some embodiments, placed on the monitoring list) if the access is associated with a TCP session and/or socket already in progress that is associated with an allowed ambient service. In some embodiments, access for an activity not already on the allowed list or the disallowed list is initially allowed (and in some embodiments, placed on the monitoring list) if the access is associated with an application already associated with and/or connected to an allowed ambient service. In some embodiments, access for an activity not already on the allowed list or the disallowed list is initially allowed (and in some embodiments, placed on the monitoring list) if the access is associated with a URL referral from an allowed URL (e.g., a URL included in an allowed list of URLs). In some embodiments, access for an activity not already on the allowed list or the disallowed list is initially allowed (and in some embodiments, placed on the monitoring list) if the access is associated with a traffic usage pattern that is within certain pre-set/predefined parameters and/or satisfies other criteria for the ambient service.

In some embodiments, device assisted services (DAS) techniques for providing an activity map for classifying or categorizing service usage activities to associate various monitored activities (by URL, by network domain, by website, by network traffic type, by application or application type, and/or any other service usage activity categorization/classification) with associated IP addresses are provided. In some embodiments, a policy control agent (not shown), service monitor agent 1696, or another agent or function (or combinations thereof) of the service processor 115 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by application or application type, and/or any other service usage activity classification/categorization) with associated IP addresses. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs (e.g., also referred to as service usage partition, service usage recording partition, service charging bucket, device generated CDRs, such as in the case where the device and not a network component are generating the usage records, ambient usage records, specialized service usage records, or other terms to indicate a service usage data record generated to provide a more refined or detailed breakdown of service usage for the device), and/or any of the various other DAS related techniques as described herein with respect to various embodiments.

In some embodiments, various techniques are used for providing the adaptive ambient service that allows for a surf-out option (e.g., to an advertisement web site or to a web site in a search result, such as a search engine's paid search result or a search engine's organic search result). In some embodiments, a surf-out option is managed using a second set of rules in the ambient service profile for the surf-out option. In some embodiments, initial allowance of a surf-out website access is based on a main ambient website generating the surf-out (e.g. with a user click), or referring the surf-out. In some embodiments, once the main ambient service creates a surf-out that will be accounted to the main ambient service usage accounting, the surf-out website access rules are constructed according to a set of temporary allowance rules. These temporary allowance rules allow the main ambient service partner to sponsor the surf-out without the danger of the surf-out website becoming a permanent allowed ambient service that the main ambient service partner must sponsor indefinitely. For example, the temporary surf-out rules can then include one or more of the three access list types, such as an allowed access list, a disallowed access list, and a monitoring access list, as similarly discussed above, and similar types of adaptive rules can be applied to create one or more of the lists. In some embodiments, differences with the temporary surf-out rules include limitations based on, for example, a total time allowed for access to the surf-out site, rules based on limiting total data transfer or transfer bandwidth, rules on content type, rules on either allowing or disallowing a secondary surf-out (or beyond secondary to third tier, or through multiple/additional tiers/degrees of separation), and/or allowing or disallowing advertising sources. For example, as similar to other ambient access list rules, the surf-out rules can also be modified based on time of day, user priority, user class, user service plan, user useful activity points, and/or network busy state.

In some embodiments, once the content offered to the user is no longer associated with the main ambient service allowed or monitoring access list, the surf-out option is limited to one or more the following: a limitation on the number of new user actions or choices; a limitation on the number of new web pages or portal pages; a limitation on the number of new URLs or sub-URLs, domains or sub domains; a limitation on the existence or type of advertisements; a limitation on the existence or type or size of certain content; a limitation on the number of new addresses; a limitation on the type of file downloads; a limitation on the number of file downloads; a limitation on the activities of a given application; a limitation on the time for the surf-out sequence; and/or a limitation on the total data transfer for the surf-out sequence. In some embodiments, once one or more of these established limitations is exceeded, then the surf-out sequence is disallowed or differentially traffic controlled or throttled in some way using, for example, the various techniques described herein. In some embodiments, the differential throttling successively reduces the allowed connection bandwidth for the ambient service surf-out sequence based on a length of time from the point at which the surf-out sequence branched from the main ambient service allowed or monitored/monitoring access list, the number of user activities since the surf-out sequence branched from the main ambient service allowed or monitored/monitoring access list, the number of web pages selected since the surf-out sequence branched from the main ambient service allowed or monitored/monitoring access list, the total data transferred since the surf-out sequence branched from the main ambient service allowed or monitored/monitoring access list, the number of new URLs or domains since the surf-out sequence branched from the main ambient service allowed or monitored/monitoring access list. In some embodiments, after the surf-out activities or sequence is disallowed or differentially traffic controlled or throttled, once the user again utilizes the ambient service in a manner that is directly associated with the main ambient service allowed access list or monitoring access list, and the main ambient service experience again provides a surf-out or click through option for the same or similar surf-out experience, then the ambient surf-out limitations, for example, can be reset, removed, reduced and/or modified so that the user can again continue the same or similar surf-out experience. In some embodiments, the surf-out sequence is stored in an access list so that the surf-out sequence is remembered (e.g., stored for) the next time a similar sequence is selected from the main ambient service allowed or monitoring lists, and there may be differential service allowances applied to the surf-out sequence.

For example, there are many advantageous application settings, service models and service business models for which this type of capability and various techniques to limit surf-out sequences and, in some cases, to then "refresh" or remove limitations or modify the limitations for the same or a similar surf-out sequence is valuable. An example is provided and one reasonably skilled in the art can appreciate how this can be applied to many more examples. For example, an Internet search service provider can be an ambient service partner that sponsors ambient service access to their search website. A search website is generally not of much value unless the user can click-through to other web sites offered up in user click through options based on search results. Thus, in this example, it is important to allow the surf-out option. In some embodiments, the search provider charges differentially for paid or sponsored search results, banners or click-throughs offered up as part of an ambient service so that, for example, the search result sponsor can help to bear the costs of ambient access in the bill by account setting. However, once the user has selected a surf-out option, it is important to make sure the surf-out sequence does not become an unlimited access allowance for the user to then surf the Internet for any purpose as this would result in completely unlimited Internet access, which the search service provider and/or the search service sponsors would be billed for. Thus, in some embodiments, it is important to limit the "search sequence tree" so that the "branches" of the surf-out sequence do not progress too far from the main "trunk" of the main ambient service. For example, the surf-out sequence "branches" can be limited in many ways, and the above embodiments are provided as examples, but at this point one skilled in the art will recognize that many more specific embodiments are possible, in which an aspect of many of the embodiments described herein is the ability to identify and allow a surf-out sequence that is not on the main ambient service allowed or monitoring list, establish a process for temporarily allowing certain types of surf-out sequence(s), and then properly limiting the surf-out sequence branches using various criteria and techniques.

In some embodiments, the surf-out option is implemented on a service processor (on a device and/or an intermediate networking device) with device assisted services. In some embodiments, the surf-out option is implemented with a combination of a service processor and a service controller. In some embodiments, the surf-out option is implemented with the various service control and monitoring verification techniques.

In some embodiments, the surf-out option is billed to a main ambient service provider or a secondary ambient service partner (e.g., based on a referring URL, such as that provided by a search engine for a search result and/or a sponsored search result). In some embodiments, the surf-out option is restricted to the associated user session. In some embodiments, the surf-out option is restricted to the associated application. In some embodiments, the surf-out option is limited by time, data usage, or any other criteria. In some embodiments, the surf-out option is controlled or restricted based on a user's current standing (e.g., good standing for service usage/billing or other purposes/criteria). In some embodiments, the user's standing is determined based on various criteria (e.g., purchase behavior, ad click through behavior, user account standing, user browsing behavior, user service data usage, reward points, or any other criteria). In some embodiments, in which a search engine is generating the click through for the surf-out session/activities, only sponsored search results for which the search provider is getting paid for displaying the search result are allowed in the ambient service for search out and/or, in some embodiments, only the sponsored search results are displayed at all.

In some embodiments, both sponsored search and un-sponsored search are displayed and allowed.

In some embodiments, there is an identifier communicated from the device (e.g., a unique application identifier, an agent header, such as in an HTML header, a cookie, such as in an HTML cookie, or a communication handshake sequence, or other secure token or secure handshake technique) to the ambient service provider (e.g., a web service or web site) that identifies the device communication traffic as being associated with an ambient service. In some embodiments, the ambient service partner can interpret the identifier to ascertain that the communication is being sponsored within an ambient service model. In some embodiments, once the ambient service partner determines that the communication is associated with an ambient service model, any aspect of any combination of the ambient service experience, service interface (e.g., web pages or portal pages) look and feel, service interface (e.g., web pages or portal pages) complexity and/or content, offered content, content resolution, offered advertising, advertising resolution, transaction offers, transaction offer content or resolution, offered service bandwidth, total data transfer delivered, surf-out options, or other aspects of the ambient service experience served up by the ambient service partner can be tailored to optimize the offered ambient service experience. In some embodiments, the ambient service partner will optimize the offered ambient service experience in this way to reduce total bandwidth delivered in cases for which the ambient service partner or some other entity is paying for the ambient service access using, for example, various bill by account techniques or using other techniques.

In some embodiments, the surf-out option is associated with a token (e.g., in a request header or some other secure or encrypted token or cookie associated with the session request) for an ambient service provider or ambient service partner, so that the surf-out session can be billed to that ambient service provider or ambient service partner, respectively. In such embodiments, the ambient service web site can receive a token request and provided that the website provides a valid token then the access to the ambient service session is allowed. In this way, a highly scalable ambient service system can be provided to any web site service partner who subscribes to the token service. In some embodiments, user information is also included in the token request to the web site provider, so that the web site provider can determine if the user is worth paying the ambient service access fees for.

In some embodiments, a token is used to identify, enable, account for, and/or establish billing for the ambient service access associated with a main ambient service and not just the surf-out sequences. In general, whenever a token enabled ambient service embodiment is discussed herein, one of ordinary skill in the art will appreciate that the token ambient service technology can be utilized for either a main ambient service or an ambient service surf-out sequence.

In some embodiments, a proxy server or router is provided, and the ambient service provider monitors, accounts, controls, and/or optimizes the service usage through the proxy server or router (e.g., using the adaptive ambient service profile and/or any of the techniques described herein). In some embodiments, the proxy server or router implements the various techniques described herein (e.g., determines if the requested access is within the ambient service profile or belongs on the monitoring or disallowed lists, whether the requested access is compliant with a surf-out option, whether the user is in good standing, whether the requested access is associated with a referring URL, adapts one or more of the three access lists, and/or whether the requested access is associated with a token for an ambient service provider or ambient service provider). For example, in some embodiments, the proxy server or router manages the secure token protocol for the surf-out option, as described herein. In some embodiments, the proxy server or router manages the bill by account for the various adaptive ambient service techniques and/or the billing of ambient service providers/partners for the adaptive ambient service provided for the surf-out option, as described herein. Each of these various techniques is further described below.

In some embodiments, a proxy network device (e.g., a proxy server or router) is provided, and the ambient service (e.g., service processor and/or service controller) directs the wireless communications device traffic to the proxy network device. In some embodiments, a proxy network device facilitates the ambient service (e.g., and/or a non-ambient service), including, for example, monitoring, accounting, controlling, providing security control, and/or optimizing the service usage through the proxy network device (e.g., using the adaptive ambient service profile and/or other associated service profile and/or any of the techniques described herein).

In some embodiments, a proxy server or router is provided (e.g., by the central provider, by the MVNO, or by the associated ambient service provider, such as an Amazon proxy server/router, or by another associated ambient service provider), and the ambient service (e.g., service processor and/or service controller) directs the wireless communications device traffic destined for the specific ambient service to the proxy server or router that supports that ambient service. In some embodiments, the proxy server or router facilitates the ambient service, including, for example, monitoring the service usage through the proxy server or router (e.g., to count bytes/data service usage levels or any other relevant metric by service/activity using the adaptive ambient service profile and/or any of the techniques described herein).

In some embodiments, a proxy server or router is provided, the service is initially an ambient service that a user subsequently upgrades to another service (e.g., any form of a non-ambient service plan) and/or the device/user initially is configured or selected another service (e.g., any form of a non-ambient service plan that provides for another/non-ambient service(s)). In some embodiments, the service e.g., service processor and/or service controller) also directs the wireless communications devices to the proxy server or router. In some embodiments, the proxy server or router facilitates the service, including, for example, monitoring/security control the service usage through the proxy server or router (e.g., to count bytes/data service usage levels or any other relevant metric by service/activity using the associated service profile and/or any of the techniques described herein). In some embodiments, the proxy server or router facilitates the service, including, for example, monitoring, accounting, controlling, security control, and/or optimizing the service usage through the proxy server or router (e.g., using the associated service profile and/or any of the techniques described herein).

In some embodiments, one or more service gateways (or router), in some cases in conjunction with a charging gateway, HLR, AAA server, base station, or other network function/element/device (any combination of these elements being a "gateway embodiment"), is provided, and the ambient service provider monitors, accounts, controls, and/or optimizes the service usage through a gateway embodiment (e.g., using the adaptive ambient service profile and/or any of the techniques described herein). In some embodiments, a gateway embodiment implements the various techniques described herein (e.g., determines if the requested access is within the ambient service profile or belongs on the monitoring or disallowed lists, whether the requested access is compliant with a surf-out option, whether the user is in good standing, whether the requested access is associated with a referring URL, adapts one or more of the three access lists, and/or whether the requested access is associated with a token for an ambient service provider or ambient service provider). For example, in some embodiments, a gateway embodiment manages the secure token protocol for the surf-out option, as described herein. In some embodiments, a gateway embodiment manages the bill by account for the various adaptive ambient service techniques and/or the billing of ambient service providers/partners for the adaptive ambient service provided for the surf-out option, as described herein. Each of these various techniques is further described below.

In some embodiments, an adaptive ambient service includes implementing an ambient service profile for assisting control of a communications device use of an ambient service on a wireless network, in which the ambient service profile includes various service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service. In some embodiments, these techniques are performed by the communications device (e.g., using a service processor), a network element/function (e.g., using a service controller, proxy server, and/or other network elements/functions/devices), and/or an intermediate networking communications device and, in some embodiments in various combinations with each other and/or with other functions/elements on the network/in communication with the network. In some embodiments, the service policy settings include one or more of the following: access control settings, traffic control settings, billing system settings, user notification with acknowledgement settings, user notification with synchronized service usage information, user privacy settings, user preference settings, authentication settings, admission control settings, application access settings, content access settings, transaction settings, and network or device management communication settings.

In some embodiments, the ambient service profile is implemented at least in part by a proxy server, in which the monitored use of the ambient service based on the ambient service profile is performed at least in part by the proxy server, and in which the proxy server communicates the ambient service traffic to the communications device. In some embodiments, the ambient service plan allows for access to the ambient service with limited service capabilities that are limited based on one or more of the following: period of time, network address, service type, content type, application type, QOS class, time of day, network capacity (e.g., network busy state), bandwidth, and data usage. In some embodiments, the ambient service plan is a low cost or free trial service plan that is bundled or provided as an option for purchase at a point of sale of the communications device. In some embodiments, the communications device is activated prior to a point of sale of the communications device, and the ambient service plan is associated with the communications device during activation. In some embodiments, the ambient service plan is associated with the communications device during one or more of the following: a manufacture of the communications device, a distribution of the communications device, or a point of sale of the communications device. In some embodiments, the ambient service plan includes an option to purchase a new service plan for the communications device in which the new service plan includes additional service capabilities. In some embodiments, the ambient service profile is programmable by one or more of the following: a manufacturer, a service provider, a distributor, a virtual service provider, and a device manager.

In some embodiments, the ambient service is a transaction based service, in which service usage for the ambient service by the communications device is not billed, and in which electronic commerce based transactions performed using the communications device are billed as transaction based charges. In some embodiments, the ambient service is a transaction based service, in which electronic commerce based transactions performed using the communications device are billed as transaction based charges, and in which at least a portion of service usage costs are billed to one or more of the following: an advertiser, a transaction provider, a mobile virtual network operator, a virtual service provider, and an ambient service provider.

In some embodiments, the communications device is a mobile communications device or an intermediate networking device, and the ambient service includes one or more Internet based services. In some embodiments, the communications device is a mobile communications device, and the ambient service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem.

In some embodiments, the implementation of the first service profile is verified based on one or more of the following: device based service usage information and network based service usage information. In some embodiments, the ambient service profile is adapted and/or updated based on updates received from the network.

FIG. 1 illustrates a wireless network architecture for providing adaptive ambient service in accordance with some embodiments. As shown, FIG. 1 includes a 4G/3G/2G wireless network operated by, for example, a central provider. As shown, various wireless devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the wireless devices 100 includes a service processor 115 (as shown), and each service processor connects through a secure control plane link to a service controller 122. In some embodiments, the network based service usage information (e.g., network based CDRs) is obtained from one or more network elements and/or assisted by device based service usage information (e.g., device assisted CDRs). As shown, an MVNO core network 210 also includes a CDR storage, aggregation, mediation, feed 118, a MVNO billing interface 122, and a MVNO billing system 123 (and other network elements as shown in FIG. 1). Those of ordinary skill in the art will appreciate that various other network architectures can be used for providing adaptive ambient services, and FIG. 1 is illustrative of just one such example network architecture for providing the adaptive ambient service techniques described herein.

In some embodiments, the various techniques for adaptive ambient services are performed (e.g., at least in part) on the device (e.g., device 100) and/or on an intermediate networking device using a service processor 115 and an ambient service profile). For example, the various techniques for adaptive ambient services can be performed on a processor of the device, and the ambient service profile can be securely stored locally on the device using various techniques for secure execution and storage.

In some embodiments, the various techniques for adaptive ambient services are performed on the device or on the intermediate networking device with assistance or verification from the network (e.g., a service controller 122 executed on any network element, in which the service controller 122 is in secure communication with the device/intermediate networking device, including the service processor 115 executed on the device/intermediate networking device). In some embodiments, adaptive ambient services are performed on the device or on the intermediate networking device with assistance or verification from the network using a service controller for maintaining a centralized set of ambient service allowed access rules and/or ambient service disallowed access rules, and a superset of all ambient service monitored access rules, working cross device population). In some embodiments, the service controller 122 or other network element(s) assist the device for implementing these techniques for adaptive ambient services (e.g., cross device, cross URL/domain usage patterns/monitoring, publishing centralized set of ambient service allowed access rules, ambient service monitored access rules, and/or ambient service disallowed access rules, including, for example, compromised and/or hacked URLs). In some embodiments, the service controller 122 or other network element(s) assist the device for implementing these techniques for adaptive ambient services by verifying the device maintained set of ambient service allowed access rules, ambient service monitored access rules, and/or ambient service disallowed access rules. In some embodiments, the service controller 122 or other network element(s) assist the device for implementing these techniques for adaptive ambient services by verifying the device monitored service usage with CDR service usage using various techniques, for example, such as those described herein. In some embodiments, the service controller 122 or other network element(s) assist the device for implementing these techniques for adaptive ambient services by verifying the device monitored service usage by IP address (e.g., using CDR by traffic destination).

In some embodiments the various techniques for adaptive ambient services are performed on the network (e.g., a gateway, router or any other network element using, for example, deep packet inspection (DPI) on the monitored (non-encrypted) network traffic).

As shown in FIG. 1, a CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment boxes attached to one or more of the sub-networks shown in FIG. 1 (e.g., central provider access network 109 and/or central provider core network 110), which is in communication with the service controller 122, and a central billing interface 127. As shown in FIG. 1, service usage 118 is shown as a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 1. In some embodiments, CDR storage, aggregation, mediation, feed 118 functionality is located or partially located in a networking component in the central provider access network 109, a networking component in the core network 110 the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be generalized as described herein and as shown in the other figures described herein as would be apparent to one of ordinary skill in the art. Also as shown in FIG. 1, the service controller 122 is in communication with the central billing interface 123 (also sometimes referred to as the external billing management interface or billing communication interface) 127, which is in communication with the central billing system 123. As shown, an order management 180 and subscriber management 182 are also in communication with the central provider core network 110 for facilitating order and subscriber management of services for the devices 100 in accordance with some embodiments.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated usage information for one or more devices on the wireless network (e.g., devices 100); and provides the device generated usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, the CDR storage, aggregation, mediation, feed 118 (and/or other network elements or combinations of network elements) includes a service usage data store (e.g., a billing aggregator) and a rules engine for aggregating the collected device generated usage information. In some embodiments, the syntax is a charging data record (CDR), and the network device is a CDR feed aggregator, and the CDR storage, aggregation, mediation, feed 118 (and/or other network elements or combinations of network elements) also aggregates CDRs for the one or more devices on the wireless network; applies a set of rules to the aggregated CDRs using a rules engine (e.g., bill by account, transactional billing, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, the CDR storage, aggregation, mediation, feed 118 (and/or other network elements or combinations of network elements) communicates a new set of CDRs for the one or more devices on the wireless network to a billing interface or a billing system. In some embodiments, the CDR storage, aggregation, mediation, feed 118 (and/or other network elements or combinations of network elements) communicates with a service controller to collect the device generated usage information for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated usage information to a billing interface or a billing system. In some embodiments, the CDR storage, aggregation, mediation, feed (and/or other network elements or combinations of network elements) communicates with a transport gateway and/or a Radio Access Network (RAN) gateway to collect the network generated usage information for the one or more devices on the wireless network. In some embodiments, the service controller 122 communicates the device generated service usage information to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the service controller 122 in communication with the CDR storage, aggregation, mediation, feed 118 (and/or other network elements or combinations of network elements) performs a rules engine for aggregating and mediating the device generated usage information. In some embodiments, a rules engine device in communication with the CDR storage, aggregation, mediation, feed 118 (and/or other network elements or combinations of network elements) performs a rules engine for aggregating and mediating the device generated usage information.

In some embodiments, the rules engine is included in (e.g., integrated with/part of) the CDR storage, aggregation, mediation, feed 118. In some embodiments, the rules engine and associated functions, as discussed herein, is a separate function/device. In some embodiments, the service controller 122 performs some or all of these rules engine based functions, as discussed herein, and communicates with the central billing interface 127. In some embodiments, the service controller 122 performs some or all of these rules engine based functions, as discussed herein, and communicates with the central billing system 123.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., the managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device based service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device generated service usage information (e.g., device assisted charging data records (CDRs)) includes a transaction type field (e.g., indicating a type of service for the associated service usage information). The rules engine can apply a rule or a set of rules based on the identified service associated with the device generated usage information to determine a bill-by-account billing offset (e.g., a new CDR can be generated to provide the determined bill-by-account billing offset). For example, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., service usage 118), and the rules engine applies one or more rules, such as those described herein and/or any other billing service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network and behaves substantially similar to other CDR generators on the network) as would be apparent to one of ordinary skill in the art.

In some embodiments, the service controller 122 is provisioned as a new type of networking function that is recognized as a valid and secure source for CDRs by the other necessary elements in the network (e.g., the Service Usage History/CDR Aggregation and Mediation Server 118). In some embodiments, where the network necessary apparatus will only recognize CDRs from certain types of networking equipment (e.g. RAN Gateway 410 or Transport Gateway 420), then the Service Controller 122 can provide authentication credentials to the other networking equipment that indicate it is one of the approved types of equipment. In some embodiments, the link between the Service Controller 122 and the necessary CDR aggregation and mediation equipment is secured, authenticated, encrypted and/or signed.

In some embodiments, the CDR storage, aggregation, mediation, feed 118 discards the network based service usage information (e.g., network based CDRs) received from one or more network elements. In these embodiments, the service controller 122 can provide the device based service usage information (e.g., device assisted/based CDRs) to the CDR storage, aggregation, mediation, feed 118 (e.g., the CDR storage, aggregation, mediation, feed 118 can just provide a store, aggregate, and communication function(s)), and the device based service usage information is provided to the central billing interface 127 or the central billing system 123.

In some embodiments, the device assisted/based CDRs and/or new CDRs generated based on execution of a rules engine as described herein is provided only for devices that are managed and/or based on device group, service plan, or any other criteria, categorization, and/or grouping, such as based on ambient service or ambient service provider.

Figure 2:
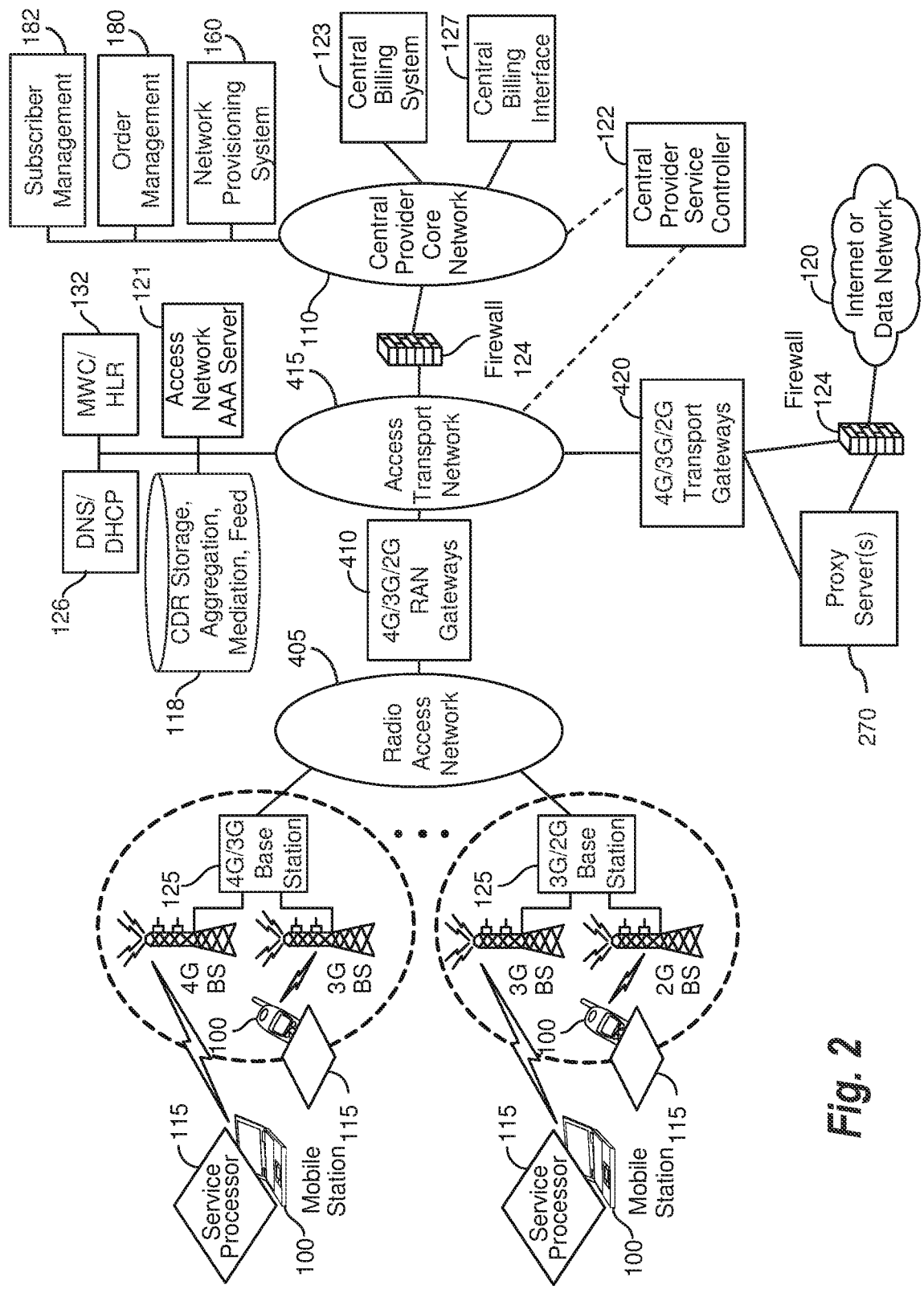
FIG. 2 illustrates a wireless network architecture for providing adaptive ambient service including a proxy server in accordance with some embodiments.

FIG. 2 illustrates a wireless network architecture for providing adaptive ambient service including a proxy server in accordance with some embodiments. As shown, FIG. 2 includes a proxy server 270 in communication with a 4G/3G/2G wireless network operated by, for example, a central provider. In some embodiments, each of the wireless devices 100 includes a service processor 115 (as shown), and each service processor connects through a secure control plane link to a service controller 122. In some embodiments, the network based service usage information (e.g., CDRs) is obtained from Radio Access Network (RAN) gateway(s) 410 and/or transport gateway(s) 420.

Referring now to the 4G/3G/2G access network as shown in FIG. 2, the 4G/3G and 3G/2G base stations/nodes 125 are in communication with a 4G/3G/2G Radio Access Network (RAN) gateway 410 via a radio access network 405, which are in communication with a 4G/3G/2G transport gateway 420 via an access transport network 415. The central provider core network 110 is in network communication with the access transport network 415 (e.g., via a dedicated/leased line, and as shown, via a firewall 124). The Internet 120 is available via a firewall 124 and the transport gateway(s) 420, as shown. Also, as shown, a network apparatus provisioning system 160, order management 180, and subscriber management 182 are in communication with the central provider core network 110. As shown, a AAA server 121, a mobile wireless center/Home Location Register (HLR) 132, a DNS/DHCP 126, and CDR storage, aggregation, mediation, feed 118 are also in communication with the access transport network 415. The central billing system 123 and the central billing interface 127 are shown in communication with the central provider core network 110.

In some embodiments, the various techniques for adaptive ambient services are performed using the proxy server 270. For example, the ambient service provider can provide the proxy server 270, and the ambient service provider monitors, accounts, controls, and/or optimizes the service usage through the proxy server 270 (e.g., using the adaptive ambient service profile and/or any of the techniques described herein). In some embodiments, the central service provider provides the proxy server 270, and the ambient service provider is provided access to monitor, account, control, and/or optimize the service usage through the proxy server 270 using the adaptive ambient service profile and/or any of the techniques described herein).

Figure 3:
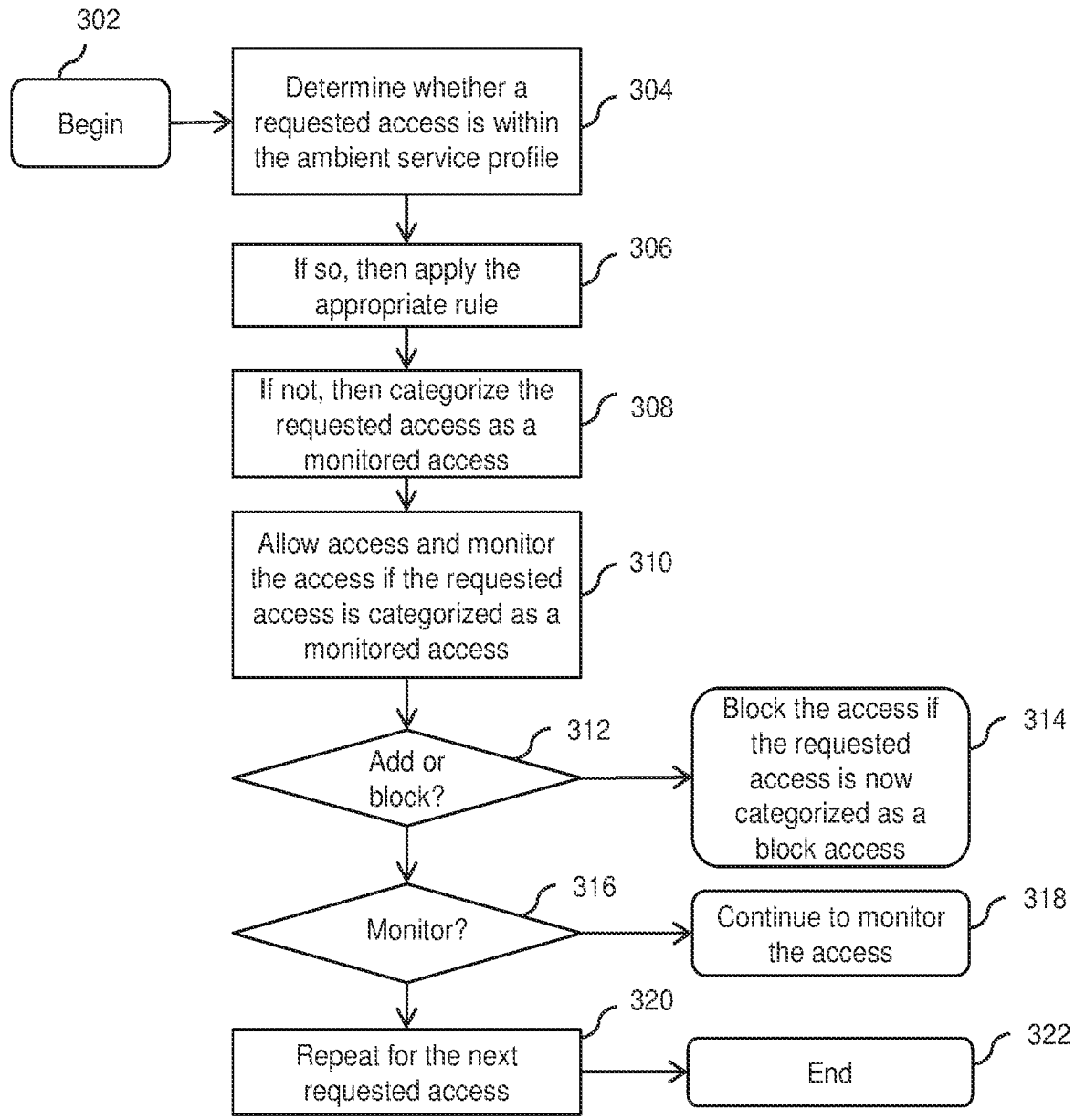
FIG. 3 illustrates a flow diagram for providing adaptive ambient service in accordance with some embodiments.

FIG. 3 illustrates a flow diagram for providing adaptive ambient service in accordance with some embodiments. At 302, the process for an adaptive ambient service begins. At 304, whether a requested access is within the ambient service profile, such as within the ambient service allowed access rules, the ambient service monitoring access rules, and/or ambient service disallowed access rules, is determined. At 306, if the requested access is within the ambient service profile, then the appropriate rule is applied, such as the appropriate ambient service allowed access rule, ambient service monitoring access rule, and/or ambient service disallowed access rule. At 308, if not (e.g., the requested access is not within the ambient service profile, such as not categorized within any of the ambient service profile rules), then categorize the requested access as a monitored access. In some embodiments, a requested access that is not otherwise known or categorized in the ambient service profile, is allowed and then monitored (e.g., trusted and then verified through monitoring and other techniques, such as the various other techniques described herein). At 310, if the requested access is categorized as monitored access, then allow the requested access and monitor the requested access. At 312, determine whether the requested access can now be added or blocked based on the monitored access. At 314, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 316, determine whether to continue to monitor the requested access (e.g., if the requested access is still in progress, and the requested access has not been otherwise categorized as allowed or blocked ambient service access, then continue to monitor), and if so, continue to monitor the requested access at 318 (e.g., if and until a determination of whether to allow and/or block such access using the various techniques described herein). At 320, the process is repeated for the next requested access. At 322, the process is completed.

Figure 4:
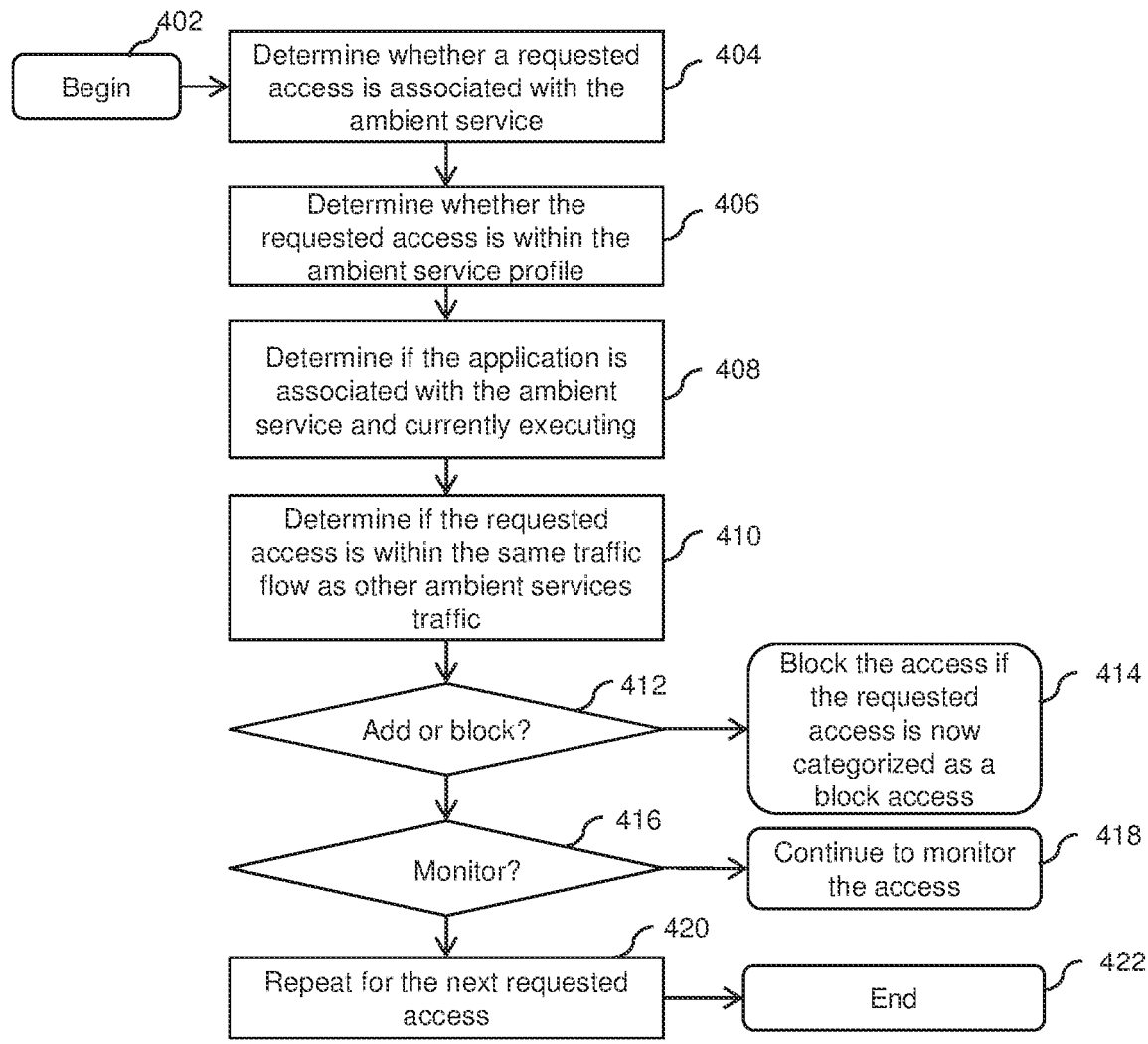
FIG. 4 illustrates another flow diagram for providing adaptive ambient service in accordance with some embodiments.

FIG. 4 illustrates another flow diagram for providing adaptive ambient service in accordance with some embodiments. At 402, the process for an adaptive ambient service begins. At 404, whether a requested access is associated with the ambient service is determined. As described herein with respect to FIG. 4, there are various techniques for testing the association of the requested access with the ambient service. For example, at 406, whether the requested access is within the ambient service profile, such as within the ambient service allowed access rules, the ambient service monitoring access rules (also sometimes referred to herein as monitored access rules), and/or ambient service disallowed access rules, is determined. At 408, whether the requested access to an application is tested to determine whether the application is associated with the ambient service and whether the application is currently executing. At 410, whether the requested access is within the same traffic flow as other ambient services traffic is determined (e.g., using various device based, device assisted and/or network based (such as DPI) traffic monitoring techniques). Various other techniques can also be employed for testing the association of the requested access with the ambient service. For example, incoming traffic can be tagged (e.g., using a referred URL or an HREF or an IMAGE HTML tag); and/or the domain object management (DOM) tree can be analyzed to determine a links model of a requested web page or other techniques can be utilized to determine the links model of the requested web page. As another example, the content of the requested access (e.g., web page content) can be analyzed to determine if it is associated with the ambient service (e.g., using various content relevancy techniques). As another example, a reverse lookup to the requested network destination (e.g., URL, associated domain, sub-domain, ad server domain, or other destination or source) can be determined to test the association of the requested access with the ambient service. At 412, based on the above testing of the association of the requested access with the ambient service, determine whether the requested access can now be added or blocked based on the monitored access. At 414, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 416, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 418. At 420, the process is repeated for the next requested access. At 422, the process is completed.

Figure 5:
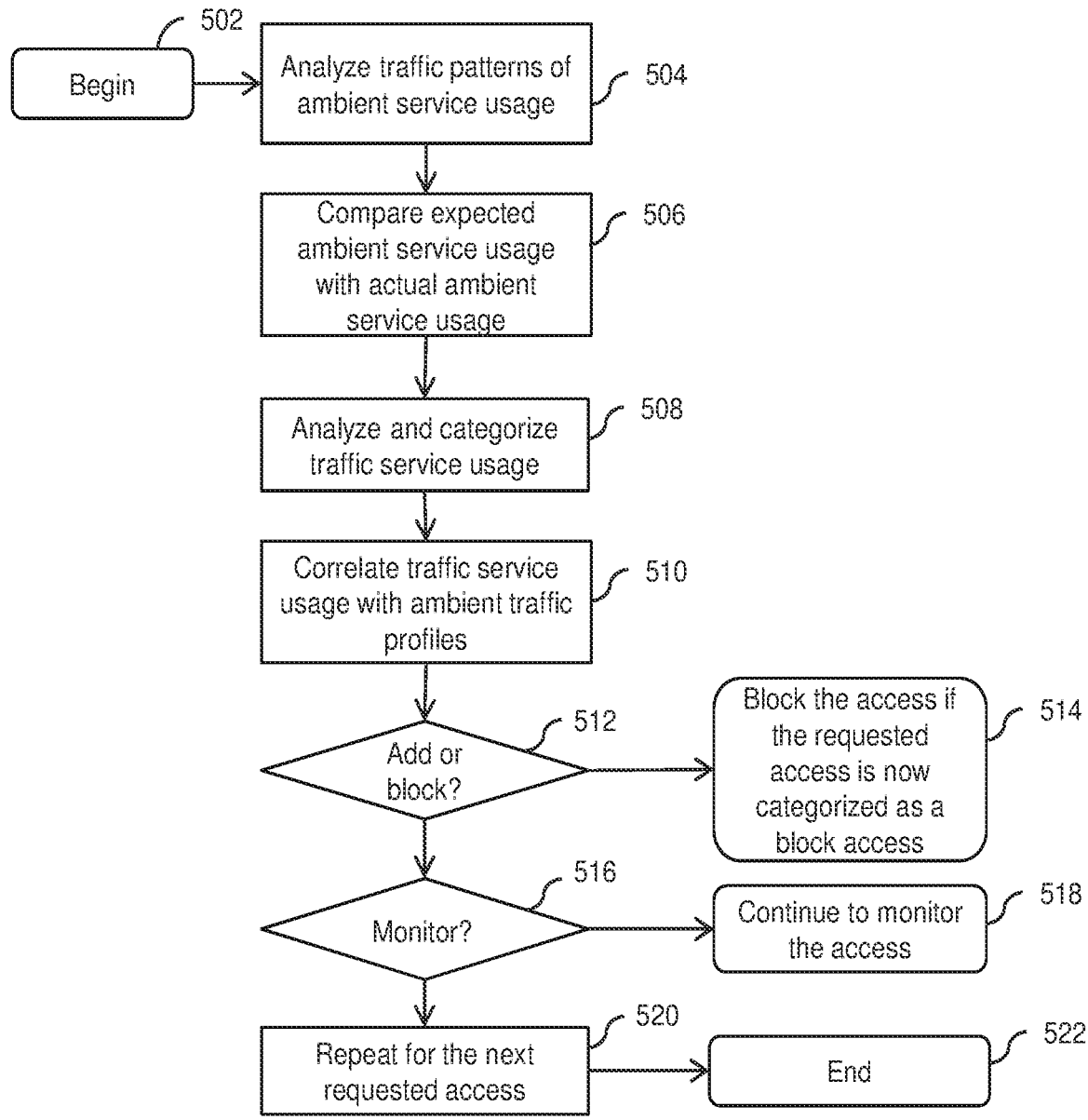
FIG. 5 illustrates another flow diagram for providing adaptive ambient service in accordance with some embodiments.

FIG. 5 illustrates another flow diagram for providing adaptive ambient service in accordance with some embodiments. At 502, the process for an adaptive ambient service begins. At 504, traffic patterns of ambient service usage are analyzed. As described herein with respect to FIG. 5, there are various techniques for testing and analyzing the ambient service usage traffic patterns to determine whether the access should be allowed, blocked, or is otherwise deemed suspicious or otherwise not known/categorized, and thus, should be monitored (e.g., using the monitoring access rules). For example, at 506, expected ambient service usage is compared with the actual ambient service usage (e.g., using various ambient service usage monitoring techniques, as described herein and/or using other techniques). In some embodiments, the expected versus actual ambient service usage is analyzed and can be further categorized as described below. At 508, the ambient service traffic usage is analyzed and categorized. In some embodiments, the ambient service traffic usage is categorized by one or more of the following: total traffic, by application, by destination (e.g., URL, domain, sub-domain, or other unique identifier), by traffic flow, by network socket, by time of day, by ambient service profile categorization (e.g., ambient service allowed access, ambient service monitored access, and/or ambient service blocked/disallowed access rules), by web browsing traffic patterns, by content download patterns, and/or using any other categorizations or patterns. In some embodiments, the ambient service traffic usage is aggregated (e.g., across user or user group), and statistical analysis techniques are used to identify categories of allowable or suspect or should be disallowed access service usage requests/patterns (e.g., very infrequently requested access for high data bandwidth ambient service usage can be deemed suspect or automatically categorized as disallowed). At 510, the ambient service traffic usage is correlated with various ambient traffic profiles. For example, buying patterns can be correlated with content download patterns (e.g., a power use categorization versus a seldom/never purchases user categorization can be used to provide different ambient service profiles and/or throttling techniques based on such categorizations for the various ambient service users).

Various other techniques can also be employed for testing the ambient service usage traffic to provide adaptive ambient services as will now be apparent to one of ordinary skill in the art in view of the embodiments and examples described herein. At 512, based on the above testing of the association of the requested access with the ambient service, determine whether the requested access can now be added or blocked based on the monitored access. At 514, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 516, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 518. At 520, the process is repeated for the next requested access. At 522, the process is completed.

Figure 6:
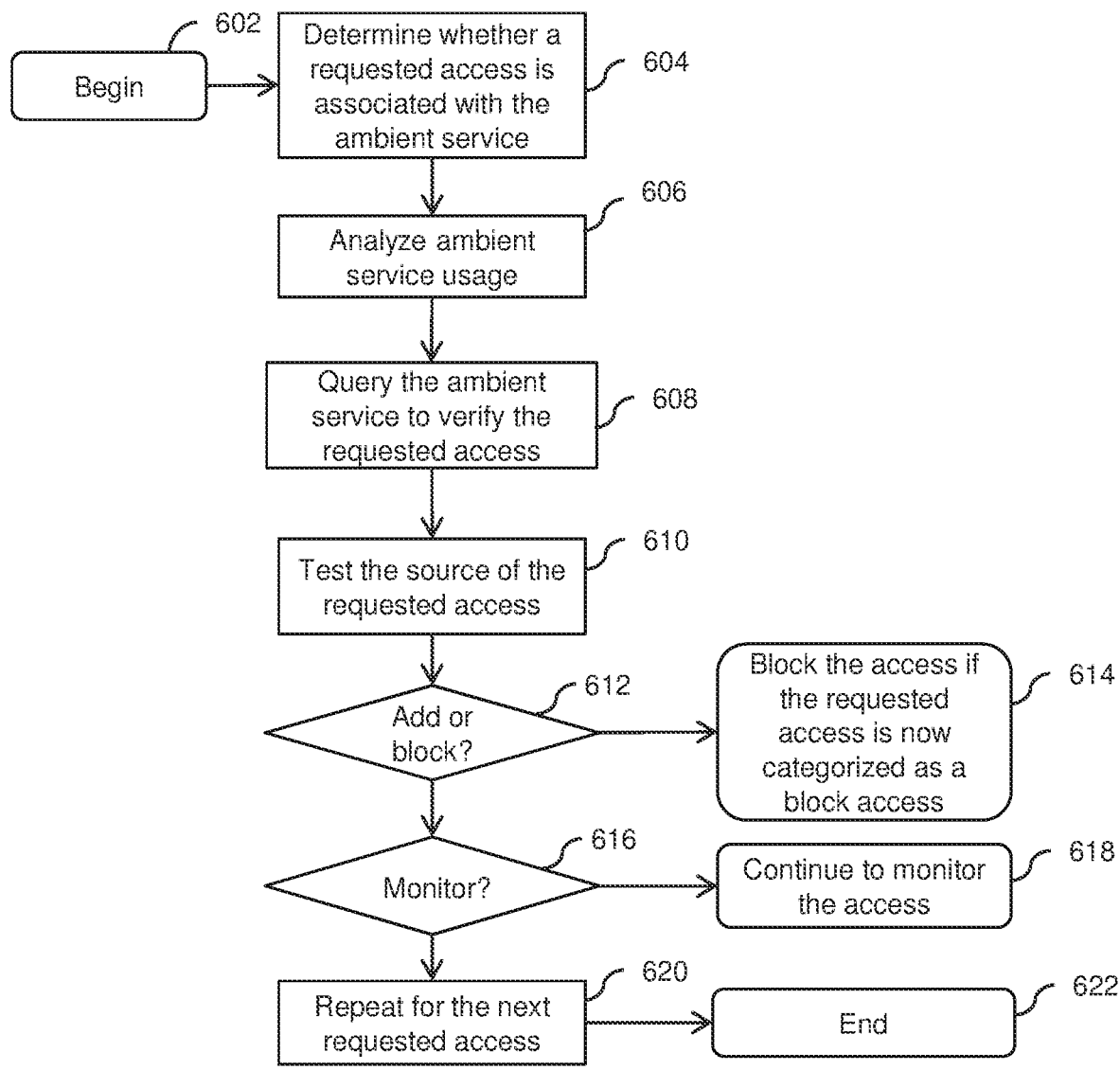
FIG. 6 illustrates another flow diagram for providing adaptive ambient service in accordance with some embodiments.

FIG. 6 illustrates another flow diagram for providing adaptive ambient service in accordance with some embodiments. In some embodiments, a combination of various techniques are used for providing adaptive ambient services, such as those described below with respect to FIG. 6. In some embodiments, a subset of these various techniques are employed using various combinations of such techniques or individual techniques. At 602, the process for an adaptive ambient service begins. At 604, whether a requested access is associated with the ambient service is determined (e.g., as similarly described above with respect to FIG. 4). At 606 the ambient service usage is analyzed (e.g., as similarly described above with respect to FIG. 5). At 608, the ambient service is queried to verify the requested access (e.g., if the requested access is not in the ambient service profile or otherwise suspicious or covered by a monitored access rule, then the ambient service can be queried for more information as to whether this requested access is associated with the ambient service usage or should otherwise be allowed). In some embodiments, various requested accesses can be allowed for certain users or for certain requests to allow for monitoring or testing but denied for other users/requests. In some embodiments, the device or intermediate networking device based ambient service profile settings (e.g., local ambient service profile rules, categorizations, settings, and/or other data) are provided to the ambient service provider for further analysis and to correlate various access requests with the ambient service (e.g., monitored access requests can be confirmed as approved or not, that is associated with the ambient service or otherwise permissible, or not, as deemed by the ambient service provider using various techniques). At 610, the source of the requested access is analyzed. In some embodiments, the source of the requested access is itself tested using various techniques (e.g., search engine/web crawler techniques or DOM techniques to determine whether certain web based requests are associated with the ambient service; or to verify with a secondary source such as an ad server; or to verify ownership of certain network domains by the ambient service provider or associated advertiser).

Various other techniques can also be employed for providing adaptive ambient services as will now be apparent to one of ordinary skill in the art in view of the embodiments and examples described herein. At 612, based on the above testing of the association of the requested access with the ambient service, determine whether the requested access can now be added or blocked based on the monitored access. At 614, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 616, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 618. At 620, the process is repeated for the next requested access. At 622, the process is completed.

Figure 7:
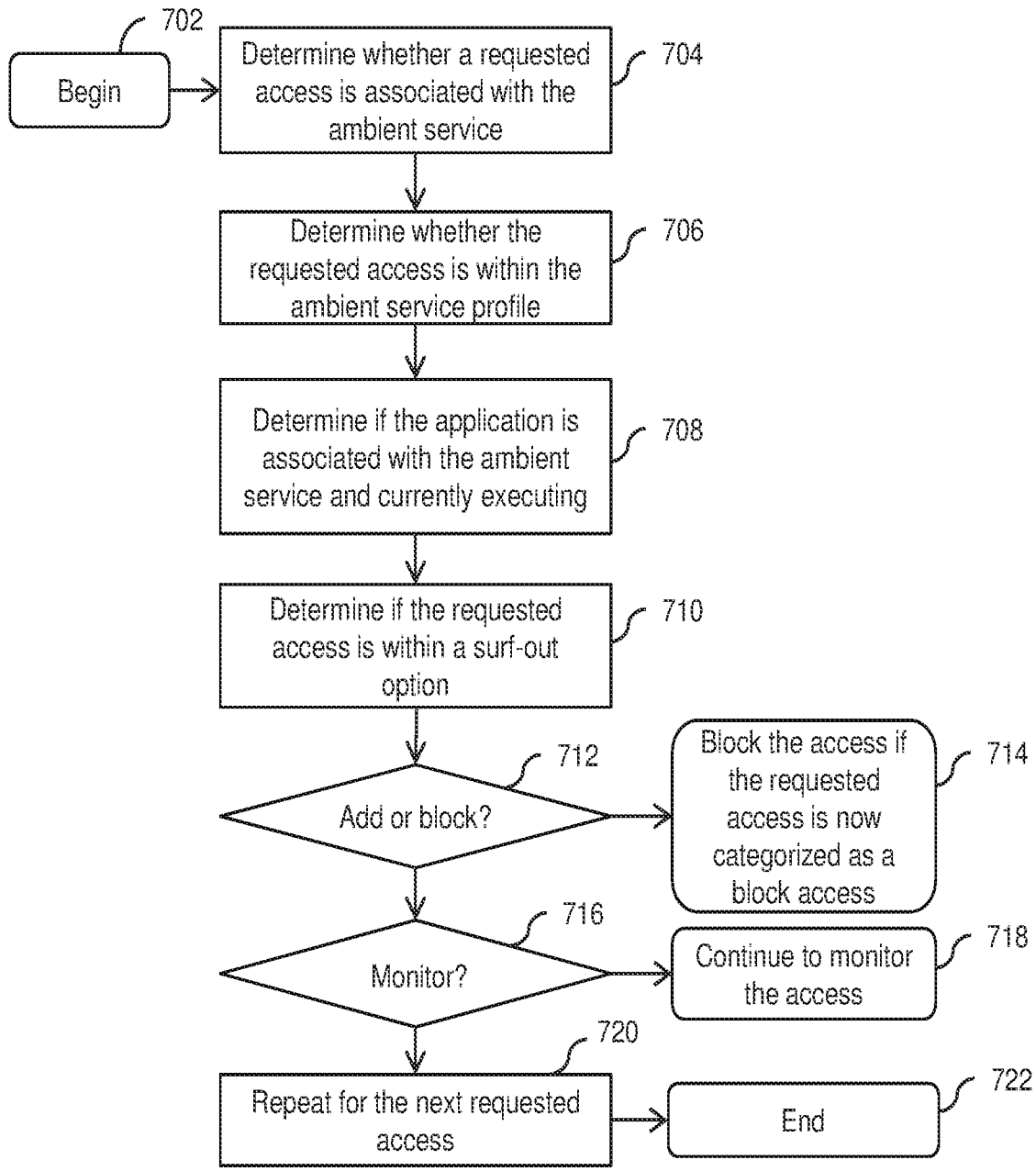
FIG. 7 illustrates a flow diagram for providing adaptive ambient service for a surf-out option in accordance with some embodiments.

FIG. 7 illustrates a flow diagram for providing adaptive ambient service for a surf-out option in accordance with some embodiments. At 702, the process for an adaptive ambient service begins. At 704, whether a requested access is associated with the ambient service is determined. As described herein with respect to FIG. 7, there are various techniques for testing the association of the requested access with the ambient service. For example, at 706, whether the requested access is within the ambient service profile, such as within the ambient service allowed access rules, the ambient service monitored access rules, and/or ambient service disallowed access rules, is determined. At 708, whether the requested access to an application is tested to determine whether the application is associated with the ambient service and whether the application is currently executing. At 710, whether the requested access is within a surf-out option is determined (e.g., using various surf-out option based techniques as described herein). At 712, based on the determination of the association of the requested access with the ambient service (e.g., using various association techniques, as described herein), determine whether the requested access can now be added or blocked based on the monitored access. At 714, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 716, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 718. At 720, the process is repeated for the next requested access. At 722, the process is completed.

In some embodiments, it may not be possible to accurately identify every network service access attempt or service usage (e.g., or traffic access) as belonging to a given service usage partition (e.g., a given ambient service usage, background network chatter usage, user service plan usage, emergency service usage, and/or other type of service usage). As used herein, the terms service usage partition, service usage recording partition, service charging bucket, and micro-CDRs are used interchangeably. Accordingly, it is desirable to provide a service charging bucket for traffic that is allowed and not definitively identified as belonging to a known service charging bucket. This allows for techniques to employ an "allow but verify" approach to traffic that is likely to be legitimately associated with an ambient service or a user service or a network service drat is intended to be allowed, but is not definitively identified as being associated with an allowed service.

As an example, there may be a web site access associated with an ambient service that does not have a reference identifier or other traffic parameter that allows the service processor to associate it with the correct ambient service. In this case, a set of rules can be applied to determine if it is likely that the web site access is a legitimate access given the access control policies that are in place, and if it is the access can be allowed and the traffic usage either recorded in the ambient service charging bucket that it is suspected to be associated with, or the traffic usage can be charged to a network chatter service usage bucket, or the traffic usage can be charged to the user service usage bucket, or the traffic usage may be recorded in a "not classified but allowed" service charging bucket. In some embodiments, in which such traffic is charged to the "not classified but allowed" service usage charging bucket, additional verification measures are employed to ensure that the amount of traffic that is not classified but allowed does not grow too large or become a back-door for service usage errors. For example, the access control policy rules for allowing unclassified traffic can be relatively loose as long as the amount of service usage charges accumulating in the not classified charging bucket remains within certain bounds, and/or the rate of service usage charged to the not classified bucket remains within certain hounds, but if the not classified traffic becomes large or the rate of not classified traffic growth becomes large then the rules governing when to allow not classified traffic can be tightened.

As another example, a browser application can access a web site that is known to be an ambient service website, and that web site might serve back a series of traffic flows, some of which are associated with the ambient service website through URL identifiers that are known to be part of the website, and other traffic can be associated with the ambient service website by virtue of a referring website tag or header, and some traffic can be returned to the same application with a relatively close time proximity to the other traffic as being identified as ambient traffic. In this example, as long as the not classified traffic service charging bucket does not exceed a given pre-set policy limit on its size, and/or does not grow faster than a given pre-set policy rate, and/or is received within a certain pre-set policy period of time difference from the time that other ambient service charging bucket traffic is received, then the not classified traffic is continued to be allowed. However, if the not classified traffic amount or rate of growth exceeds the pre-set policy limits, or if the period of time between when verified ambient service traffic is received and the not classified traffic is received exceeds policy limits, then the not classified traffic can be blocked or other action can be taken to further analyze the not classified traffic.

In some embodiments, it is important to provide a hierarchy of service usage charging rules for the various service usage partitions on a device. As an example, for a given service plan there can be two ambient service charging buckets, a network chatter (e.g., or network overhead) service charging bucket, and a user service plan service charging bucket and it is desirable to make sure that no ambient services or network overhead service or unclassified service is charged to the user service plan, and it is also desirable to ensure that all known ambient service traffic is charged to the appropriate ambient service partner, and it is desirable to ensure that no network overhead service or unclassified service is charged to ambient service partners. In such situations, a service charging bucket hierarchy can be provided as follows: determine if a traffic flow (e.g., or socket) is associated with network overhead, and if so allow it and charge that service bucket, then determine if a traffic flow (or socket) is associated with ambient service #1, and if so allow it and charge that service bucket, then determine if a traffic flow (or socket) is associated with ambient service #2, and if so allow it and charge that service bucket, then determine if a traffic flow (or socket) is associated with not classified traffic, and if so allow it and charge that service bucket, then if the traffic is not associated with any of the above service charging buckets allow it and charge it to the user service plan charging bucket. In another example, if the user has not yet chosen to pay for a user service plan, then the same hierarchical access control and service charging policy can be used except the final step would be: then if the traffic is not associated with any of the above service charging buckets block the traffic. Hierarchical service charging bucket identification such as depicted in these examples can be a crucial aspect of a robust access control policy and/or service charging policy system. Many other access control policy hierarchies and service charging bucket policy hierarchies will now be apparent to one of ordinary skill in the art.

In some embodiments, the not classified traffic is charged according to service charging rules that rely on the most likely candidate service charging bucket for the traffic. As another example, if the not classified traffic is being delivered to the same application as other known ambient service traffic and the time difference between delivery of the known ambient service traffic and the not classified traffic is small, then the not classified traffic can be charged to the ambient service in accordance with a pre-set charging policy rule specifying these conditions. Other embodiments that will now be apparent to one of ordinary skill in the art. For example, another charging rule for not classified traffic could be to perform a pro-rata allocation of the not classified traffic to all of the other service charging buckets with the pro-rata allocation being based on the percentage of the total traffic used by the device for each service charging bucket. As another example, the not classified traffic can be charged to a subset of the service charging buckets for the device (e.g., all ambient services plus the network overhead service) in accordance with the pro-rata share for each service included in the pro-rata split.

In some embodiments, the user service plan agreement is structured so that the user acknowledges that ambient services in which the access connection to the service is sponsored, paid for, and/or partially subsidized by an entity other than the user are a benefit to the user, and/or the user acknowledges that there is no inherent right to free ambient services, and that the service usage accounting system may not always properly characterize usage for a sponsored or subsidized ambient service (e.g., or some other specialized service) in the correct accounting service charging bucket, and, thus, the user service plan account can be charged and/or billed with some of this traffic. By having the user acknowledge a service use agreement of this form then some ambient traffic can be charged to the user service plan account, including, for example, allowed but not classified traffic, excess ambient service usage beyond pre-set policy limits, ambient service usage during busy network periods or on congested network resources, and/or other criteria/measures. In some embodiments, the user might be notified that they are being charged for service activities that are sometimes subsidized or free to the user. As discussed above, it is important to ensure that a not classified service charging bucket does not become a back door for service charging errors or hacking. It will now be apparent to one of ordinary skill in the art that the not classified service usage charges can be verified in a variety of manners, including, for example, observing the size of the not classified service charging bucket as compared to other service usage charges on the device (e.g., total device service usage, ambient service usage, user bucket service usage, and/or other criteria/measures), capping the not classified bucket, and/or capping the rate of growth of the not classified bucket.

In some embodiments, it is important to verify not only that the total device service usage amount is correct, but that the service usage is being reported in the proper service charging buckets. For example, if the service processor software can be hacked so that it correctly reports the total service usage, but reports user service plan traffic under one or more ambient service buckets, then simply verifying that the total amount of service usage is correct will not be sufficient to prevent the device from obtaining free user service that can be charged to ambient service partners. There are a variety of direct and indirect embodiments to accomplish this verification of service charging bucket divisions. For example, in direct verification embodiments, one or more alternative measures of service usage are employed to cross-check the accuracy of the service charging bucket divisions. In indirect embodiments one of two classes of verification are employed: the size and rate of growth for service charging buckets is analyzed and compared to a pre-set group of policies to detect and/or modify service charging bucket growth that is out of policy; and/or the proper operation of the service processor elements involved in service charging bucket partitioning is verified.

Various embodiments involving direct verification of service charging bucket usage and/or accounting include the use of network based service usage measures such as CDRs, IPDRs, flow data records (e.g., FDRs—detailed reports of service usage for each service flow, such as network socket connection, opened and used to transmit data to or from the device), accounting records, interim accounting records or other similar usage records to verify that the device is within service policy and/or the device based service usage reports are accurate. Use of such network generated service usage records to directly verify service charging and/or proper service usage policy adherence are described herein. When network address destination and/or source information is available in these records, as described herein, this can be used in some embodiments to verify the service charging bucket accounting provided by the device service processor. In some embodiments, some types of service usage records include real-time data but not necessarily all of the useful information needed to help verify service charging bucket accounting, while other types of service usage records provide more detail (e.g., IP address for destination and source) but do not always arrive in real-time. For example, in some embodiments, FDRs are created each time a new service flow (e.g., network socket connection) is opened and then closed. At the time the service flow is closed, a (e.g., possibly time stamped) data usage record indicating source address, destination address and amount of data transmitted is created and sent to a charging aggregation function in the network. The charging aggregation function can then forward the FDRs to the service controller for verification or direct accounting of service charging bucket accounting. By comparing the FDR addresses with known ambient service traffic address associations, the partitioning of service charging buckets between one or more ambient services and other services such as a user service plan service charging bucket may be verified. However, in some cases it can be a long period of time for an FDR to be generated when a device service flow (e.g., socket) remains open for a long period of time, as in the case for example with a long file download, a peer to peer connection with a socket keep alive, or a proxy server service with a socket keep alive. In such cases, it can be disadvantageous to have large amounts of data to be transferred without an FDR to confirm device service processor based reports, and in some cases this can provide an opportunity for service processor service reporting hacks. This can be remedied in a variety of ways by using other network reported service usage information to augment the FDR information. For example, start and stop accounting records can sometimes be obtained in some embodiments from a network element such as a service gateway or the AAA servers (e.g., or other network equipment elements depending on the network architecture). Although start and stop records do not possess the detail of service usage information that FDRs, CDRs, IPDRs, interim accounting records or other service usage records posses, they do inform the service controller that a device is either connected to the network or has stopped connecting. If a device is connected to the network and is not transmitting device usage reports or heartbeats, then the service controller is alerted that an error or hacking condition is likely. As another example of how two or more types of network reported service usage information may be used to create a better real time or near real-time check on device service usage, if both FDRs and start/stop accounting records are available, the service controller can send a stop-then-resume service command to the device (e.g., or alternatively send a stop then resume service command to a network equipment element), which will cause the device to terminate all open service flows before re-initiating them, and once the service flows are stopped then the FDR flow records will be completed and transmitted for any service flows that were in process but unreported when the stop service command was issued. This will cause any long term open socket file transfers to be reported in the FDR flow records thus plugging the potential back door hole in the FDR service usage accounting verification method.

As another example showing how multiple types of network generated service usage accounting records may be used to complement each other and strengthen the verification of service charging bucket accounting partitions, interim data records can be used with FDRs. Interim data records are available in accordance with some embodiments, in which the interim data records are generated on a regularly scheduled basis by a network element (e.g., gateway, base station, HLR, AAA, and/or other network element/function). Interim data records are typically near real time records that report the aggregate traffic usage for the device as of a point in time, but often do not include traffic address information or other traffic details. In embodiments in which both interim accounting records and FDRs are available, when the interim accounting records are indicating service usage that is not being reported in the FDR stream this is evidence that a device has one or more long term socket connections that are open and are not terminating. In this case, the service controller can verify that the device based usage reports are properly accounting for the total amount of service usage reported by the interim accounting records, and/or the service controller can force an FDR report for the open sockets by issuing a stop-resume service command as similarly discussed above.

As described herein, other embodiments involving direct verification of service charging bucket accounting can be provided. One example is to route ambient service traffic to a proxy server or router programmed to support only the network access allowed for the ambient service and to account for the ambient service usage. Additional proxy servers or routers can be similarly programmed for each ambient service that is part of the device service plan, and in some embodiments, another proxy server or router is programmed to support traffic control and account for the user service plan service access. By comparing the service usage accounting for each of these proxy servers or routers, the device generated service charging bucket accounting can be directly verified. In some embodiments, the usage accounting provided by the proxy servers or routers is used directly for service usage accounting.

In some embodiments, ambient service partner feedback is used to verify service charging bucket accounting. For example, web servers used by ambient service partners to provide ambient services can identify a user device based on header information embedded in the HTML traffic, and then account for either the service used by the device during the ambient service sessions or account for the number of transactions the user completes. If service usage is recorded, then it can be reported to the service controller and be used directly to verify ambient service charging bucket accounting. If transactions are all that are recorded, then this can be reported to the service controller and the amount of ambient service used by the device can be compared with the number of transactions completed to determine if the ambient service usage is reasonable or should be throttled or blocked. It will now be apparent to one of ordinary skill in the art that other embodiments can be provided that employ more than one type of network generated service usage records to verify service usage accounting and/or verify service charging bucket accounting.

Other embodiments involving indirect methods for verifying or controlling service charging bucket accounting include monitoring the size and/or growth rate of ambient service usage. In some embodiments, the access control policy rules call for restricting a given ambient service access when the amount of service usage charges accumulating in the ambient service charging bucket exceed a pre-set policy limit, and/or when the rate of service usage for the ambient service exceeds a pre-set policy limit. For example, once these limits are reached, the ambient service can be throttled back for a period of time blocked for a period of time, or charged to the user service plan charging bucket. In some embodiments, before these actions are taken the user UI can be used to notify the user of the service policy enforcement action. In some embodiments, indirect verification of service charging bucket accounting includes the various techniques described herein for verifying proper operation of the service processor agent software and/or protecting the service processor agent software from errors, manipulation, or hacking.

In some embodiments, the device service processor directs traffic destined for a given ambient service to a proxy server or router programmed to support that ambient service, and any traffic control policies and/or access control policies for the ambient service are implemented in the proxy server or router. For example, in such embodiments the proxy server or router can be programmed to only allow access to one or more ambient services that are authorized by the device service plan, with the proxy server or router controlling device access so that other network destinations cannot be reached. Continuing this example embodiment, the proxy server or router can account for the ambient service usage in an ambient service charging bucket as discussed elsewhere. In such proxy server or router ambient service control embodiments, the same traffic association techniques described elsewhere that allow incoming traffic associated with an ambient service website or other service to be identified, allowed or blocked, potentially throttled, and accounted for in a service charging bucket can be implemented in the proxy server or router programming. Such proxy server or router embodiments can also implement user service plan service charging buckets, user service plan traffic controls, and user service plan access control as discussed herein. In some embodiments, the proxy server or router analyzes the HTML traffic content of the traffic flows as described herein to perform such associations, traffic control and/or service usage accounting. Similarly, in some embodiments, a proxy server or router can provide the "surf-out" capabilities described herein by performing the same surf-out traffic associations (e.g., HTML branch reference associations and/or other branch associations) described herein. It will now be apparent to one of ordinary skill in the art that many of the adaptive ambient service control and service usage charging functions described herein for a service processor can be readily implemented with a proxy server or router that is appropriately programmed.

In some embodiments, routing of device traffic for one or more ambient services and/or user service plan services to a proxy server or router is accomplished by the device service processor using the device service processor traffic control embodiments described herein. In some embodiments, routing of device traffic for one or more ambient services and/or user service plan services to a proxy server or router is accomplished by dedicated network equipment such as the gateways (e.g. SGSN, GGSN, PDSN, or PDN) home agents, HLRs or base stations, with the network equipment being provisioned by a service controller (e.g., or other interchangeable network element with similar functions for this purpose) to direct the device traffic to the proxy server or router. In some embodiments, the ambient service traffic or the user service plan traffic is controlled by the proxy server according to a service plan policy set supplied by the service controller (e.g., or equivalent network function for this purpose). The traffic control service policy thus implemented by the proxy server can control traffic based on one or more of the following: period of time, network address, service type, content type, application type, QoS class, time of day, network busy state, bandwidth, and data usage.

In some embodiments, a proxy server or router is used to verify accounting for a given service, for example, an ambient service. In some embodiments, this is accomplished by the device service processor directing the desired service flows to a proxy server or router programmed to handle the desired service flows, with the proxy server or router being programmed to only allow access to valid network destinations allowed by the access control policies for the desired service, and the proxy server or router also being programmed to account for the traffic usage for the desired services. In some embodiments, the proxy service usage accounting may then be used to verify device based service usage accounting reported by the service processor. In some embodiments, the accounting thus reported by the proxy server or router can be used directly to account for service usage, such as ambient service usage or user service plan service usage.

In some embodiments, in which a proxy server is used for device service usage accounting, the proxy server maintains a link to the device service notification UI via a secure communication link, such as the heartbeat device link described herein. For example, the proxy server or router can keep track of device service usage versus service plan usage caps/limits and notify the user device UI through the device communication link (e.g., heartbeat link) between the service controller and the device. In some embodiments, the proxy server/router communicates with a device UI in a variety of ways, such as follows: UI connection through a device link (e.g., heartbeat link), through a device link connected to a service controller (e.g., or other network element with similar function for this purpose), presenting a proxy web page to the device, providing a pop-up page to the device, and/or installing a special portal mini-browser on the device that communicates with the proxy server/router. In some embodiments, the UI connection to the proxy server/router is used as a user notification channel to communicate usage notification information, service plan choices, or any of the multiple services UI embodiments described herein.

In some embodiments for the proxy server/router techniques for implementing service traffic/access controls and/or service charting bucket accounting, it is desirable to have the same information that is available to the service processor on the device, including, for example, application associated with the traffic, network busy state, QoS level, or other information about the service activity that is available at the device. For example, such information can be used to help determine traffic control rules and/or special services credit is due (e.g., ambient services credit). In some embodiments, information available on the device can be communicated to the proxy server/router and associated with traffic flows or service usage activities in a variety of ways. For example, side information can be transmitted to the proxy server/router that associates a traffic flow or service activity flow with information available on the device but not readily available in the traffic flow or service activity flow itself. In some embodiments, such side information may be communicated over a dedicated control channel (e.g., the device control link or heartbeat link), or in a standard network connection that in some embodiments can be secure (e.g., TLS/SSL, or a secure tunnel). In some embodiments, the side information available on the device can be communicated to the proxy server/router via embedded information in data (e.g., header and/or stuffing special fields in the communications packets). In some embodiments, the side information available on the device can be communicated to the proxy server/router by associating a given secure link or tunnel with the side information. In some embodiments, the side information is collected in a device agent or device API agent that monitors traffic flows, collects the side information for those traffic flows, and transmits the information associated with a given flow to a proxy server/router. It will now be apparent to one of ordinary skill in the art that other techniques can be used to communicate side information available on the device to a proxy server/router.

For example, just as the hierarchy of charging rules can be important for implementations in which the service processor is creating the service charging bucket accounting, it can also important in implementations that use a proxy server or router for service charging bucket accounting. Accordingly, various embodiments described herein for creating a hierarchy of service usage charging rules can be applied to proxy server or proxy router embodiments. It will be apparent to one of ordinary skill in the art that the service charging bucket embodiments and traffic control and access control embodiments described herein for allowed but not classified buckets apply equally to the proxy server/router embodiments. For example, pre-defined service policy rules can be programmed into the proxy server/router to control the traffic flows and/or place usage limits or access limits on an ambient service, or a user service plan service. It will also now be apparent to one of ordinary skill in the art that the embodiments described herein disclosing an initial allowed service access list, temporarily allowing additional service activities until they are determined to be allowed or not allowed, expanding the allowed service activity list, maintaining a not allowed service activity list and expanding the not allowed service activity list also apply equally to proxy server/router embodiments. Similarly, it will now be apparent to one of ordinary skill in the art that the proxy/server router embodiments can be employed to directly generate the service charging bucket (or micro-CDR) usage reports used to provide further detail and/or billing capabilities for service usage. In some embodiments, in which the device service processor directs traffic to a proxy server/router, there are advantageous design feature embodiments available that can reduce the need to provision network to detect and force specialized device service traffic to the appropriate proxy server/router. For example, this can be done by creating a "usage credit" system for the services supported by the proxy server/outer. Total service usage is counted on the one hand by the device service processor, or by other network equipment, or by both. Credit on the other hand for ambient service or other specialized access service usage that is not charged to the user is then provided for services that the device directs through the proxy server/router destination (e.g., URL or route hop) supporting the particular ambient service or other specialized access service. If the device correctly directs traffic to the proxy server/router, then the counting and/or access rules are correctly implemented by the proxy server/router. The service can be thus controlled and/or accounted for. When the service is accounted for, the proxy server/router reports the service charging bucket accounting back to the service controller (e.g., or other network equipment responsible for service charging bucket/micro CDR mediation) and the user service plan service charging bucket account can be credited for the services. Traffic that reaches the proxy server/router is controlled by the access rules and/or traffic control rules and/or QoS control rules of the proxy server/router programming, so there is no question regarding the type of service that is supported with the service charging buckets that are reported to mediation functions (e.g., mediation functions can be performed by one or more of service controller, usage mediation, billing, AAA, and/or HLR/home agent). As the proxy server/router is in the network and can be physically secured and protected from hacking, there is high confidence that the service control and/or charging rules intended for ambient services or some other specialized service are properly implemented and that the proxy server/router connection is being used for the intended service and not some other unintended hacked service. If the device is somehow hacked or otherwise in error so that the traffic is not directed through the appropriate proxy server/router, then the proxy server/router does not log the traffic in micro CDRs/buckets and no specialized service usage credit is sent to the mediation functions, so there is no usage credit deducted from the device user service plan service usage totals. Thus, the user pays for the services when the device is hacked to avoid the proxy server/router. The user account service agreement can specify that if the user tampers with software and traffic is not routed to servers then credit will not be provided and user plan will be charged.

In some proxy server/router embodiments, the usage credit is sometimes recorded by the proxy server/router detecting which device is performing the access. Device identification can be accomplished in a variety of ways including a header/tag inserted into the traffic by the device, a route in the network specified for that device, a secure link (e.g., TLS/SSL, IP Sec, or other secure tunnel), a unique device IP address or other credential (e.g., where proxy server/router has access to an active IP address look up function), a unique proxy server/router address and/or socket for the device.

In some embodiments, the coordination of the device service controller traffic control elements with a proxy server/outer can make it simpler to locate, install, provision and operate the proxy servers. The proxy server/routers do not need to be located "in line" with the access network because it is the device's responsibility to make sure the traffic is routed to the servers/routers or else there is not credit and the user account is charged. In some embodiments, this makes it unnecessary or reduces the need to force device traffic routes in carrier network. In some embodiments, the proxy server/routers can be located in carrier network or on the Internet. If the proxy server/routers are on Internet, then traffic can be authenticated in a firewall before being passed to server/routers to enhance security to attack.

In some embodiments, the service charging bucket recording software in the proxy server/router can be programmed into an ambient service partners network equipment directly thus eliminating the need for special apparatus. The ambient service partners equipment (e.g., a web server, load balancer or router) can recognize the device using one of the techniques described above, aggregate the device service charging bucket accounting, and periodically send the usage accounting to the service controller or other network service usage mediation function.

Programming and/or provisioning the types of ambient services, user service plan services and/or specialized services disclosed in various embodiments described herein can be a complex process. In some embodiments, a simplified user programming interface, also referred to herein as a service design interface, is used to program the necessary policy settings for such services is desirable. For example, a service design interface is provided that organizes and/or categorizes the various policy settings that are required to set up an ambient service (e.g., or other service) including one or more of the following: a policy list of service activities that are allowed under the ambient service (e.g., or other service), access control policies, rules for implementing and/or adapting an allowed list of network destinations, rules for implementing and/or adapting a blocked list of network destinations, service charging bucket policies, user notification policies, service control, and/or service charging bucket verification policies, actions to be taken upon verification errors. In some embodiments, the required information for one or more of these policy sets is formatted into a UI that organizes and simplifies the programming of the policies. In some embodiments, the UI is partly graphical to help the user understand the information and what settings need to be defined in order to define the service. In some embodiments, the UI is created with an XML interface. In some embodiments, the UI is offered via a secure web connection. In some embodiments, a basic service policy for an ambient service (e.g., or another service) is created that includes one or more of the above service policy settings, and then this service policy set becomes a list or an object that can be replicated and used in multiple service plan policy set definitions (e.g., "dragged and dropped" in a graphical UI). In some embodiments, the resulting set of policies created in this service design interface are then distributed to the necessary policy control elements in the network and/or on the device that act in coordination to implement the service policy set for a given device group. For example, if a service processor is used in conjunction with a service controller, then the service design interface can load the service policy settings subsets that need to be programmed on the service controller and the device service processor into the service controller, and the service controller loads the service controller policy settings subset into the service controller components that control the policies and loads the device policy settings subset to the devices that belong to that device group. In embodiments in which a proxy server/router is used to help control and account for services, in some embodiments, the service design interface loads the service policy settings subsets that need to be programmed on the proxy server/router into the proxy server/router. In embodiments where other network equipment (e.g., gateways, base stations, service usage recording/aggregation/feed equipment, AAA, home agent/HLR, mediation system, and/or billing system) need to be provisioned or programmed, in some embodiments, the service design interface also loads the appropriate device group policy subsets to each of the equipment elements. Accordingly, various techniques can be used as described herein to greatly simplify the complex task of translating a service policy set or service plan into all the myriad equipment and/or device settings, programming, and/or provisioning commands required to correctly implement the service. It will now be apparent to one of ordinary skill in the art that various of these techniques can similarly be used for the VSP service design interface.

Those of ordinary skill in the art will appreciate that various other rules can be provided for the rules engine as described herein. Those of ordinary skill in the art will also appreciate that the functions described herein can be implemented using various other network architectures and network implementations (e.g., using various other networking protocols and corresponding network equipment and techniques).

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference the following U.S. patent applications for all purposes: application Ser. No. 12/695,020, entitled ADAPTIVE AMBIENT SERVICES, filed Jan. 27, 2010; application Ser. No. 12/380,780, entitled AUTOMATED DEVICE PROVISIONING AND ACTIVATION, filed Mar. 2, 2009; provisional Application No. 61/206,354, entitled SERVICES POLICY COMMUNICATION SYSTEM AND METHOD, filed Jan. 28, 2009; provisional Application No. 61/206,944, entitled SERVICES POLICY COMMUNICATION SYSTEM AND METHOD, filed Feb. 4, 2009; provisional Application No. 61/207,393, entitled SERVICES POLICY COMMUNICATION SYSTEM AND METHOD, filed Feb. 10, 2009; provisional Application No. 61/207,739, entitled SERVICES POLICY COMMUNICATION SYSTEM AND METHOD, filed Feb. 13, 2009; provisional Application No. 61/275,208, entitled ADAPTIVE AMBIENT SERVICES, filed Aug. 25, 2009; and provisional Application No. 61/237,753, entitled ADAPTIVE AMBIENT SERVICES, filed Aug. 28, 2009.

What is claimed is:

1. A method performed by a device including a processor and a memory storing a plurality of applications having a first set of one or more applications and a second set of one or more applications, the method comprising:
   monitoring a data traffic flow including a plurality of data packets associated with the plurality of applications being executed by the processor on the device, the plurality of data packets being generated by the plurality of applications for transmission over a wireless access network;
   determining whether one or more of the plurality of data packets are associated with the first set of one or more applications;
   when the one or more of the plurality of data packets are determined to be associated with the first set of one or more applications:
      directing the one or more of the plurality of data packets to a first network element through the wireless access network, the first network element having a destination address different than a destination address specified in the one or more of the plurality of data packets; and
      providing an identifier associated with the first set of one or more applications to a second network element through the wireless access network;
   when the one or more of the plurality of data packets are determined to not be associated with the first set of one or more applications:
      forwarding the one or more of the plurality of data packets to the destination address specified in the one or more of the plurality of data packets, over the wireless access network, without directing the one or more of the plurality of data packets to the first network element.

2. The method of claim 1, wherein the first set of the plurality of applications is associated with a set of rules enabled by a device agent, the set of rules specifying the first set of the plurality of applications and the first network element, the method further comprising:
   classifying the plurality of data packets according to the set of rules to determine that the one or more of the plurality of data packets are associated with the first set of one or more applications.

3. The method of claim 1, wherein providing the identifier to the second network element includes modifying at least one of the one or more of the plurality of data packets with information identifying at least an application type associated with the at least one of the one or more of the plurality of data packets.

4. The method of claim 1, wherein providing the identifier to the second network element includes:
   communicating the identifier over a dedicated control channel, a standard network connection, a secure network connection, or a secure tunnel.

5. The method of claim 1, wherein the first set of the plurality of applications is associated with a transaction-based service.

6. The method of claim 1, wherein the first network element is a proxy server associated with the first set of the plurality of applications.

7. The method of claim 1, further comprising:
   receiving data from a third network element; and
   in response to receiving the data, removing an application from the first set of the plurality of applications.

8. The method of claim 1, wherein the device is a mobile device.

9. A device comprising:
   a processor; and
   a memory storing a plurality of applications having a first set of one or more applications and a second set of one or more applications;
   the processor configured to:
      monitor a data traffic flow including a plurality of data packets associated with the plurality of applications being executed by the processor on the device, the plurality of data packets being generated by the plurality of applications for transmission over a wireless access network;
      determine whether one or more of the plurality of data packets are associated with the first set of one or more applications;
      when the one or more of the plurality of data packets are determined to be associated with the first set of one or more applications:
         direct the one or more of the plurality of data packets to a first network element through the wireless access network, the first network element having a destination address different than a destination address specified in the one or more of the plurality of data packets; and
         provide an identifier associated with the first set of one or more applications to a second network element through the wireless access network;
      when the one or more of the plurality of data packets are determined to not be associated with the first set of one or more applications:
         forward the one or more of the plurality of data packets to the destination address specified in the one or more of the plurality of data packets, over the wireless access network, without directing the one or more of the plurality of data packets to the first network element.

10. The device of claim 9, wherein the first set of the plurality of applications is associated with a set of rules enabled by a device agent, the set of rules specifying the first set of the plurality of applications and the first network element, wherein the processor is further configured to:
    classify the plurality of data packets according to the set of rules to determine that the one or more of the plurality of data packets are associated with the first set of one or more applications.

11. The device of claim 9, wherein providing the identifier to the second network element includes modifying at least one of the one or more of the plurality of data packets with information identifying at least an application type associated with the at least one of the one or more of the plurality of data packets.

12. The device of claim 9, wherein providing the identifier to the second network element includes communicating the identifier over a dedicated control channel, a standard network connection, a secure network connection, or a secure tunnel.

13. The device of claim 9, wherein the first set of the plurality of applications is associated with a transaction-based service.

14. The device of claim 9, wherein the first network element is a proxy server associated with the first set of the plurality of applications.

15. The device of claim 9, wherein the processor is further configured to:
   receive data from a third network element; and
   in response to receiving the data, remove an application from the first set of the plurality of applications.

16. The device of claim 9, wherein the device is a mobile device.

\* \* \* \* \*